(12) United States Patent
Snyder et al.

(10) Patent No.: US 11,593,795 B1
(45) Date of Patent: Feb. 28, 2023

(54) IDENTITY INFORMATION CONTROLLED FINANCIAL ACCOUNT DEVICE

(71) Applicant: Alclear, LLC, New York, NY (US)

(72) Inventors: Matthew Snyder, New York, NY (US); Joe Trelin, Seattle, WA (US)

(73) Assignee: ALCLEAR, LLC, New York, NY (US)

( * ) Notice: Subject to any disclaimer, the term of this patent is extended or adjusted under 35 U.S.C. 154(b) by 162 days.

(21) Appl. No.: 16/803,879

(22) Filed: Feb. 27, 2020

(51) Int. Cl.
*G06Q 20/38* (2012.01)
*H04W 12/37* (2021.01)

(52) U.S. Cl.
CPC ........ *G06Q 20/3821* (2013.01); *H04W 12/37* (2021.01)

(58) Field of Classification Search
None
See application file for complete search history.

(56) References Cited

U.S. PATENT DOCUMENTS

| | | |
|---|---|---|
| 8,381,969 B1 | 2/2013 | Miller et al. |
| 8,423,462 B1 | 4/2013 | Amacker et al. |
| 8,521,131 B1 | 8/2013 | Ramalingam et al. |
| 8,620,039 B2 | 12/2013 | Burke |
| 8,744,966 B1 | 6/2014 | Amacker et al. |
| 8,756,680 B2 | 6/2014 | Shashidhar |
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |

(Continued)

*Primary Examiner* — Scott S Trotter
*Assistant Examiner* — Amit Patel
(74) *Attorney, Agent, or Firm* — Brownstein Hyatt Farber Schreck, LLP

(57) ABSTRACT

A processing unit and a mobile identity information controlled financial account device may communicate. The processing unit receives at least one digital representation of a biometric, obtains identity information using the at least one digital representation of the biometric, and determines whether or not to transmit an authorization signal to the mobile identity information controlled financial account device that enables use of the mobile identity information controlled financial account device in at least one transaction involving at least one financial account. The mobile identity information controlled financial account device may be usable for the at least one transaction when the mobile identity information controlled financial account device receives the authorization signal. The processing unit may also receive a first digital representation of a biometric for a first person along with at least one permission to assign regarding the mobile identity information controlled financial account device for a second person.

21 Claims, 23 Drawing Sheets

(56) References Cited

U.S. PATENT DOCUMENTS

| | | |
|---|---|---|
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 11,151,481 B1 | 10/2021 | Sun et al. |
| 2002/0062291 A1 | 5/2002 | Zoka |
| 2004/0221303 A1 | 11/2004 | Sie |
| 2006/0253710 A1 | 11/2006 | Koo |
| 2007/0075130 A1 | 4/2007 | Potrykus |
| 2008/0120509 A1 | 5/2008 | Simon |
| 2009/0289110 A1 | 11/2009 | Regen et al. |
| 2011/0295748 A1 | 12/2011 | Woodriffe |
| 2013/0056539 A1 | 3/2013 | Iwaloye |
| 2014/0129446 A1 | 5/2014 | Woronec |
| 2014/0189720 A1 | 7/2014 | Terrazas |
| 2015/0100485 A1 | 4/2015 | Skliar |
| 2015/0220931 A1* | 8/2015 | Alsina .................... G06Q 20/12 705/44 |
| 2015/0294515 A1 | 10/2015 | Bergdale |
| 2016/0189063 A1 | 6/2016 | Nie |
| 2017/0188103 A1 | 6/2017 | Pan |
| 2018/0007060 A1 | 1/2018 | Leblang et al. |
| 2018/0349909 A1* | 12/2018 | Allen ............... G06Q 20/40145 |
| 2019/0036939 A1 | 1/2019 | Johansson et al. |
| 2019/0050631 A1 | 2/2019 | Hayase |

\* cited by examiner

IDENTITY INFORMATION CONTROLLED FINANCIAL ACCOUNT DEVICE

FIELD

The described embodiments relate generally to financial account devices. More particularly, the present embodiments relate to financial account devices that are controlled using identity information.

BACKGROUND

People use a wide variety of different devices. Examples of such devices include desktop computing devices, laptop computing devices, mobile computing devices, wearable devices, smart phones, tablet computing devices, financial account devices, printers, displays, televisions, digital media players, thermostats, kitchen appliances, vehicles, vaporizer devices, navigation devices, entertainment devices, power tools, climate control devices, lighting devices, security devices, smart houses or other smart buildings, electronic devices, and so on.

The use of some devices may be controlled. In some cases, only people with certain identity information associated with their identities (such as age, name, financial status, criminal status, personal history, and so on) may be allowed to operate a device and/or to operate certain functions of a device. For example, in various situations, operation of a vehicle may be restricted to people who are at least sixteen years of age.

SUMMARY

The present disclosure relates to authorizing a mobile identity information controlled financial account device. A processing unit and a mobile identity information controlled financial account device may communicate directly or indirectly. The processing unit may receive at least one digital representation of a biometric (such as via a biometric reader device included in and/or separate from the mobile identity information controlled financial account device), obtain identity information using the at least one digital representation of the biometric (such as via an identity system device), and determine whether or not to transmit an authorization signal to the mobile identity information controlled financial account device that enables use of the mobile identity information controlled financial account device in at least one transaction involving at least one financial account (such as when the mobile identity information controlled financial account device is presented to a payment accepting device associated with the at least one transaction). The mobile identity information controlled financial account device may be usable for the at least one transaction when the mobile identity information controlled financial account device receives the authorization signal. The processing unit may also receive a first digital representation of a biometric for a first person along with at least one permission to assign regarding the mobile identity information controlled financial account device and then determine whether or not to authorize use of the mobile identity information controlled financial account device when a second digital representation of a biometric for a second person is received.

In various embodiments, a system for authorizing a mobile identity information controlled financial account device includes a non-transitory storage medium that stores instructions, a biometric reader device, at least one communication unit, and a processor. The processor executes the instructions to communicate with the mobile identity information controlled financial account device using the at least one communication unit; receive at least one digital representation of a biometric using the biometric reader device; obtain identity information from an identity system device, via the at least one communication unit, using the at least one digital representation of the biometric; and determine whether to transmit an authorization signal to the mobile identity information controlled financial account device using the at least one communication unit based on the identity information wherein the authorization signal enables use of the mobile identity information controlled financial account device in at least one transaction involving at least one financial account.

In some examples, the at least one communication unit is a short-range communication unit and a long-range communication unit, the processor communicates with the mobile identity information controlled financial account device using the short-range communication unit, and the processor obtains the identity information from the identity system device using the long-range communication unit. In various implementations of such examples, the short-range communication unit is at least one of a near-field communication unit, a Bluetooth communication unit, or a Bluetooth Low Energy communication unit and the long-range communication unit is a WiFi communication unit or a cellular communication unit.

In a number of examples, the mobile identity information controlled financial account device is configured to deauthorize after receiving the authorization signal if the communication between the mobile identity information controlled financial account device and the at least one communication unit is interrupted. In some examples, the identity information includes at least one permission and the processor determines whether to transmit the authorization signal based on the at least one permission. In a number of implementations of such examples, the at least one permission restricts at least one of a transaction time, a transaction place, a transaction subject, a transaction amount, an aggregate transaction amount, or an aggregate number of transactions. In various examples, the processor receives transaction information for the at least one transaction and evaluates the transaction information in determining whether to transmit the authorization signal.

In some embodiments, a mobile identity information controlled financial account device includes a non-transitory storage medium that stores instructions, a communication unit operative to communicate with an enabling device, and a controller. The controller executes the instructions to obtain at least one digital representation of a biometric, transmit the at least one digital representation of the biometric to the enabling device using the communication unit, and determine whether to authorize use of the mobile identity information controlled financial account device in at least one transaction involving at least one financial account based on identity information obtained by the enabling device from an identity system device using the at least one digital representation of the biometric.

In various examples, the controller determines to authorize use of the mobile identity information controlled financial account device and transmits an authorization indication to a payment accepting device for the at least one transaction.

In some examples, the mobile identity information controlled financial account device further includes a biometric reader device that the controller uses to obtain the at least one digital representation of the biometric. In a number of examples of such implementations, the at least one digital representation of the biometric is a first digital representation of a biometric and the controller is operative to receive a second digital representation of a biometric via the biometric reader device and deauthorize use of the mobile identity information controlled financial account device when the second digital representation of the biometric mismatches the first digital representation of the biometric. In some implementations of such examples, the controller attempts to reauthorize use of the mobile identity information controlled financial account device by transmitting the second digital representation of the biometric to the enabling device using the communication unit.

In a number of examples, the controller deauthorizes operation of the mobile identity information controlled financial account device upon interruption of communication with the enabling device.

In various embodiments, a system for authorizing a mobile identity information controlled financial account device includes a non-transitory storage medium that stores instructions, at least one biometric reader device, at least one communication unit, and a processor. The processor executes the instructions to communicate with the mobile identity information controlled financial account device using the at least one communication unit; receive a first digital representation of a biometric for a first person using the at least one biometric reader device; receive at least one permission from the first person to assign regarding the mobile identity information controlled financial account device; receive a second digital representation of a biometric for a second person using the at least one biometric reader device; obtain identity information from an identity system device, via the at least one communication unit, using the second digital representation of the biometric for the second person; and determine whether to transmit an authorization signal to the mobile identity information controlled financial account device using the at least one communication unit based on the identity information and the at least one permission wherein the authorization signal enables use of the mobile identity information controlled financial account device in at least one transaction involving at least one financial account.

In some examples, the first digital representation of the biometric for the first person and the second digital representation of the biometric for the second person are received from a same electronic device that includes the at least one biometric reader device.

In a number of examples, the first digital representation of the biometric for the first person is received from a first electronic device that includes a first biometric reader device and the second digital representation of the biometric for the second person is received from a second electronic device that includes a second biometric reader device. In some implementations of such examples, the processor requests the second digital representation of the biometric for the second person from the second electronic device upon receipt of the at least one permission. In various implementations of such examples, the mobile identity information controlled financial account device is configured to deauthorize after receiving the authorization signal upon interruption of communication between the mobile identity information controlled financial account device and the at least one communication unit.

In some examples, the at least one permission is temporary. In various examples, the at least one permission specifies transaction restrictions.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
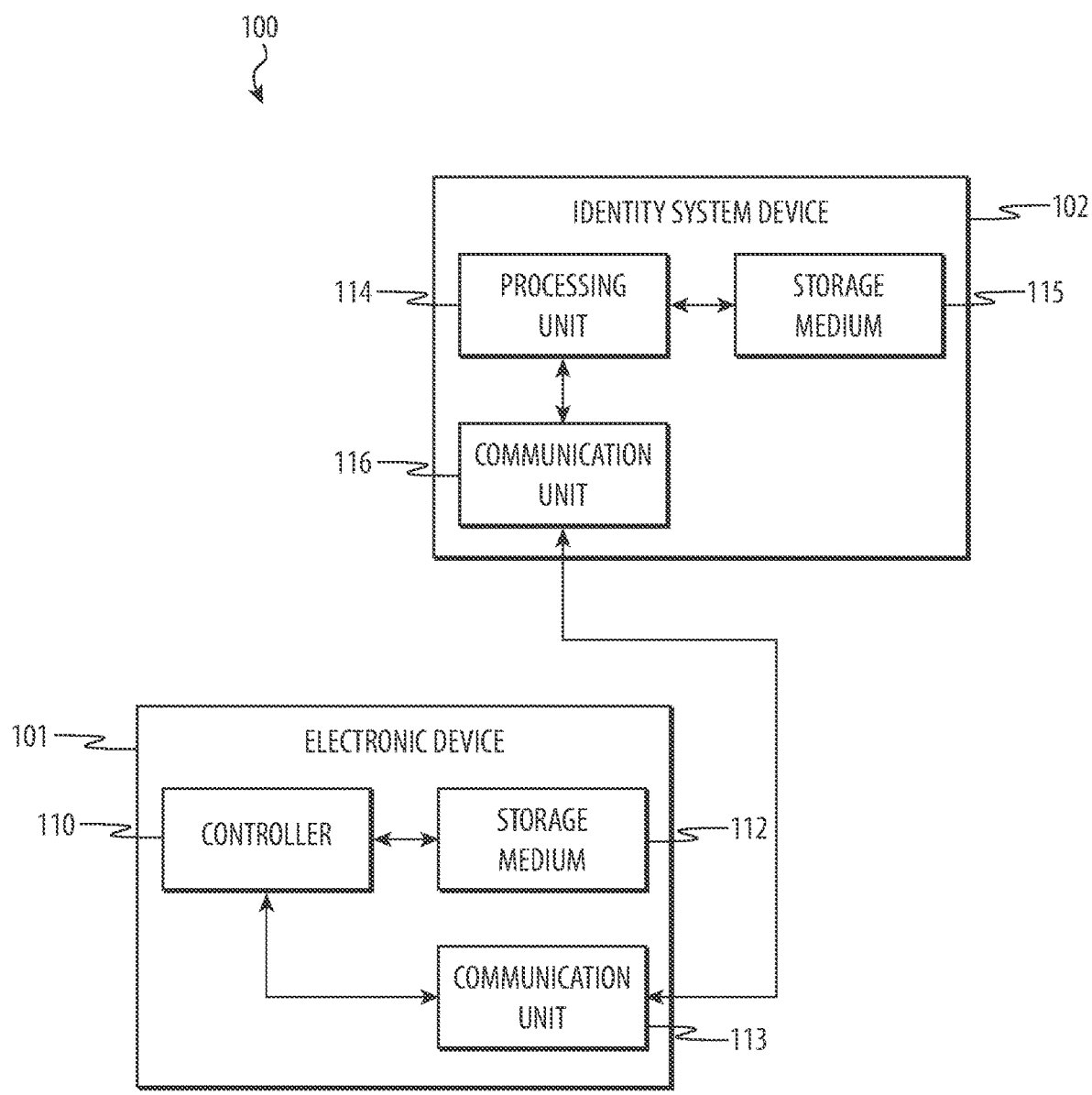
FIG. 1 depicts a first example system for authorizing a mobile identity information controlled device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Financial account devices may include any kind of device that may be used to perform one or more functions related to one or more financial accounts. Examples of such financial account devices may include credit cards, debit cards, smart cards, rewards account cards, loyalty account cards, gift cards, mobile and/or other computing devices usable to perform one or more functions related to one or more financial accounts, and so on. Examples of such financial accounts may include one or more credit card accounts, checking accounts, savings accounts, rewards accounts, loyalty accounts, airline miles accounts, insurance accounts, and so on. Examples of functions that may be performed related to one or more financial accounts may include paying for one or more transactions using the one or more financial accounts, updating information related to one or more financial accounts, assigning and/or updating one or more permissions regarding one or more functions that one or more people may perform using one or more financial accounts and/or one or more financial account devices, and so on.

Controlling the use of financial account devices may prove challenging. In many situations, control may involve a payment accepting device (such as a merchant point of sale system) contacting a financial account issuer to verify that a financial account is currently valid for making payments upon presentation of a financial account device. However, this may place hardware, software, and other burdens on financial account issuer systems in order to constantly handle and respond to verification requests. Further, this may also place similar burdens on systems associated with the payment accepting device related to constantly communicating with the financial account issuer systems. Even temporary issues that may prevent communication between systems associated with the payment accepting device and the financial account issuer systems may prevent any kind of verification.

Additionally, this approach may be limited to verifying financial account validity and may not provide significant functionality relating to whether or not the person presenting the financial account device is authorized to do so, what permissions that person has, and so on. Personnel associated with the payment accepting device may be limited to checking that the person presenting the financial account device claims to have a name associated with the financial account (such as printed on the financial account device), verifying that the person has proof of identification (such as a driver's license or the like) bearing a same name as is associated with the financial account, verifying that a signature of the person matches one associated with the financial account, and so on. Any of these techniques may be forged and/or not reliably establish the person's permission to use the financial account and/or the financial account device. Moreover, these techniques do not support the ability of an authorized person granting permissions to another person.

In another approach, a payment accepting device may obtain a biometric from a person presenting a financial account device and the financial account issuer may receive and compare that biometric to stored data associated with the financial account before verifying the current valid state of the financial account and that the person is authorized to use the financial account. However, though this provides some additional ability to evaluate whether or not the person is authorized to use the financial account, this still places many of the above hardware and/or software system burdens on systems associated with the payment accepting device and the financial account issuer. For example, this may do little to ameliorate hardware and/or software burdens regarding systems associated with the payment accepting device and the financial account issuer being configured with the ability to constantly communicate with each other, handle requests, perform comparisons, evaluate results, and so on.

The following disclosure relates to authorizing a mobile identity information controlled financial account device. A processing unit and a mobile identity information controlled financial account device may communicate directly or indirectly. The processing unit may receive at least one digital representation of a biometric (such as via a biometric reader device included in and/or separate from the mobile identity information controlled financial account device), obtain identity information using the at least one digital representation of the biometric (such as via an identity system device), and determine whether or not to transmit an authorization signal to the mobile identity information controlled financial account device that enables use of the mobile identity information controlled financial account device in at least one transaction involving at least one financial account (such as when the mobile identity information controlled financial account device is presented to a payment accepting device associated with the at least one transaction). The mobile identity information controlled financial account device may be usable for the at least one transaction when the mobile identity information controlled financial account device receives the authorization signal. The processing unit may also receive a first digital representation of a biometric for a first person along with at least one permission to assign regarding the mobile identity information controlled financial account device and then determine whether or not to authorize use of the mobile identity information controlled financial account device when a second digital representation of a biometric for a second person is received.

In this way, authorization can be controlled at the mobile identity information controlled financial account device with a great amount of granularity and fidelity to specific people, for specific transactions, at specific times, and so on as would not otherwise be performable by conventional systems. This may enable a wide variety of functionality beyond determining whether or not a financial account is currently valid and/or whether or not a person claims to have a name and/or provides a signature matching one on a card and/or otherwise associated with a financial account. Further, this may free up systems involving payment accepting devices and/or financial account issuers from having to constantly communicate with each other and/or determine financial account validity. As such, these systems and/or larger systems with which they are involved may operate more efficiently, eliminate redundant components, and/or use less hardware and/or software resources than would otherwise be possible in conventional systems.

In various embodiments, a system for authorizing a mobile identity information controlled financial account device may include a non-transitory storage medium that stores instructions, a biometric reader device, at least one communication unit, and a processor. The processor may execute the instructions to communicate with the mobile identity information controlled financial account device using the at least one communication unit; receive at least one digital representation of a biometric using the biometric reader device; obtain identity information from an identity system device, via the at least one communication unit, using the at least one digital representation of the biometric; and determine whether to transmit an authorization signal to the mobile identity information controlled financial account device using the at least one communication unit based on the identity information wherein the authorization signal enables use of the mobile identity information controlled financial account device in at least one transaction involving at least one financial account.

In some embodiments, a mobile identity information controlled financial account device may include a non-transitory storage medium that stores instructions, a communication unit operative to communicate with an enabling device, and a controller. The controller may execute the instructions to obtain at least one digital representation of a biometric, transmit the at least one digital representation of the biometric to the enabling device using the communication unit, and determine whether to authorize use of the mobile identity information controlled financial account device in at least one transaction involving at least one financial account based on identity information obtained by the enabling device from an identity system device using the at least one digital representation of the biometric.

In a number of embodiments, a system for authorizing a mobile identity information controlled financial account device may include a non-transitory storage medium that stores instructions, at least one biometric reader device, at least one communication unit, and a processor. The processor may execute the instructions to communicate with the mobile identity information controlled financial account device using the at least one communication unit; receive a first digital representation of a biometric for a first person using the at least one biometric reader device; receive at least one permission from the first person to assign regarding the mobile identity information controlled financial account device; receive a second digital representation of a biometric for a second person using the at least one biometric reader device; obtain identity information from an identity system device, via the at least one communication unit, using the second digital representation of the biometric for the second person; and determine whether to transmit an authorization signal to the mobile identity information controlled financial account device using the at least one communication unit based on the identity information and the at least one permission wherein the authorization signal enables use of the mobile identity information controlled financial account device in at least one transaction involving at least one financial account.

Various configurations are possible and contemplated without departing from the scope of the present disclosure. These and other embodiments are elaborated in more detail below.

Operation of electronic devices other than financial account devices may also be controlled. Different approaches may be used to control all or part of the operation of an electronic device based on various different identity information. For example, retailers may only sell age-restricted electronic devices to people who are at least the appropriate age and provide a government issued identification proving their age. However, a legitimate purchaser may then provide the age-restricted electronic device to an underage person. By way of another example, an age-restricted electronic device may be configured with electronic components that scan a government issued identification, verify that the government issued identification is valid and for that person, and that the government issued identification evidences that the person is at least the appropriate age. However, such components may significantly increase the size and cost of an electronic device, as well as increase the resources the electronic device consumes.

The following disclosure also relates to a system for authorizing a mobile identity information controlled device. At least one digital representation of a biometric may be received using a biometric reader device. Identity information may be obtained from an identity system device using the digital representation of the biometric. Operation of a mobile identity information controlled device may be controlled using the identity information. In this way, operation of a mobile identity information controlled device may be controlled using identity information while protecting access to the identity information. This may enable performance of functions not previously performable by the system, reduce the number of system components, prevent duplication of components, prevent identity information and/or biometric data from being stored by the mobile identity information controlled device, minimize communication connection traffic, improve the efficiency and/or operation of the system, and so on.

In some embodiments, the mobile identity information controlled device may include the biometric reader device and the mobile identity information controlled device may communicate with the identity system device. In other embodiments, the mobile identity information controlled device may communicate with an enabling device that includes the biometric reader and/or communicates with the identity system device in order to authorize operation.

In various embodiments, the digital representation of the biometric may be reobtained each time that the mobile identity information controlled device is operated. If the digital representation is not reobtained (which may involve reobtaining the identity information, comparing the digital representation of the biometric to a previous one used to obtain the identity information, and so on), operation may be deauthorized. This may prevent a person from providing the digital representation of the biometric to authorize operation and then providing the mobile identity information controlled device to another person. In other embodiments, the digital representation of the biometric may be reobtained upon the occurrence of a condition, such as movement of the mobile identity information controlled device, alteration of the mobile identity information controlled device, expiration of a time period, interruption of a communication connection between the mobile identity information controlled device and an enabling device and/or the identity system device, receipt of a deauthorization signal, travel of the mobile identity information controlled device away from an enabling device, and so on. This may balance fraud prevention with network communication, efficient operation, and so on.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 depicts a first example system 100 for authorizing a mobile identity information controlled device. The system 100 may include an electronic device 101, which may be a mobile identity information controlled device and/or an enabling device for a mobile identity information controlled device. The system 100 may also include an identity system device 102.

The electronic device 101 may be any kind of device. Examples of such devices include, but are not limited to, one or more desktop computing devices, laptop computing devices, mobile computing devices, wearable devices, tablet computing devices, mobile telephones, smart phones, printers, displays, vehicles, kitchen appliances, vaporizers, entertainment system devices, digital media players, smart houses or other smart buildings, and so on. The electronic device 101 may include one or more controllers 110 and/or other processors and/or processing units, one or more non-transitory storage media 112 (which may take the form of, but is not limited to, a magnetic storage medium; optical storage medium; magneto-optical storage medium; read only memory; random access memory; erasable programmable memory; flash memory; and so on), one or more communication units 113, and/or one or more other components (such as one or more biometric reader devices, input/output components, buttons, sensors, and so on). The controller 110 may execute one or more sets of instructions stored in the non-transitory storage media 112 to perform various functions, such as obtaining identification information, communicating with the identity system device 102 via the communication unit 113, and so on.

Similarly, the identity system device 102 may include one more processing units 114, non-transitory storage media 115, communication units 116, and/or other components. The processing unit 114 may execute one or more sets of instructions stored in the non-transitory storage media 115 to perform various functions, such as receiving identification information, comparing identification information to stored identification information to determine associated stored identity information, communicating with the electronic device 101 via the communication unit 116, and so on.

The electronic device 101 may be operable to receive identification information, such as one or more hashes and/or other digital representations of one or more biometrics, one or more account logins, one or more passwords, and so on. The electronic device 101 may transmit the identification information directly and/or indirectly to the identity system device 102. The identity system device 102 may determine whether the identification information is associated with stored identity information (such as one or more names, addresses, phone numbers, social security numbers, credit card and/or other financial information, payment records, purchase and/or other behavior records, age and/or verified age, driver's license and/or other identification or authorization information, vehicle rental contract information, insurance verification, and so on). If so, the identity system device 102 may return and/or otherwise allow access to associated identity information and/or one or more attestations regarding such directly and/or indirectly to the electronic device 101 (such as whether a person is of at least a certain age, whether or not a person is authorized to operate a vehicle, and so on). The electronic device 101 may use the identity information and/or attestation regarding such to authorize and/or deny and/or otherwise restrict partial or full operation of the electronic device 101 and/or an associated device.

For example, the electronic device 101 may be a vehicle. The vehicle may include a biometric reader device, such as a fingerprint scanner, an optical fingerprint scanner, a phosphorescent fingerprint scanner, a time-of-flight sensor, a camera, an image sensor, a saliva sensor, a deoxyribonucleic acid sensor, a heart rhythm monitor, a microphone, and so on. The vehicle may use the biometric reader device to obtain one or more digital representations of one or more biometrics (such as a digital representation of a fingerprint, a voiceprint, a facial image, a retina image, an iris image, a deoxyribonucleic acid sequence, a heart rhythm, a gait, and so on) for a person. The vehicle may transmit the digital representation of the biometric to the identity system device 102. The identity system device 102 may determine if stored identity information is associated with stored biometric data matching the digital representation of the biometric. The identity system device 102 may also determine whether such stored identity information indicates the person is of age to operate the vehicle, has insurance covering the vehicle, is a permitted operator of the vehicle, has a license to operate the vehicle, and so on. The identity system device 102 may return such information to the vehicle and/or one or more attestations regarding such. Using the information and/or attestation, the vehicle may allow and/or deny and/or otherwise restrict operation of the vehicle by the person.

In various embodiments, the electronic device 101 may reobtain the identification information and/or the identity information and/or attestation each time operation is attempted. If the electronic device 101 is not able to reobtain the identification information and/or the identity information and/or attestation, the electronic device may deauthorize operation. This may prevent a person from providing the identification information to authorize operation and then providing the electronic device 101 or an associated device to another person. In other embodiments, the electronic device 101 may reobtain the identification information and/or the identity information and/or attestation upon the occurrence of a condition, such as movement of the electronic device 101 or an associated device, alteration of the electronic device 101 or an associated device, expiration of a time period (such as ten minutes, one day, and so on), interruption of a communication connection between the electronic device 101 and another device (such as the identity system device 102, an associated device, and so on), receipt of a deauthorization signal, travel of the electronic device 101 away from an associated device and/or vice versa, and so on. This may balance fraud prevention with network communication, efficient operation, and so on.

Figure 2:
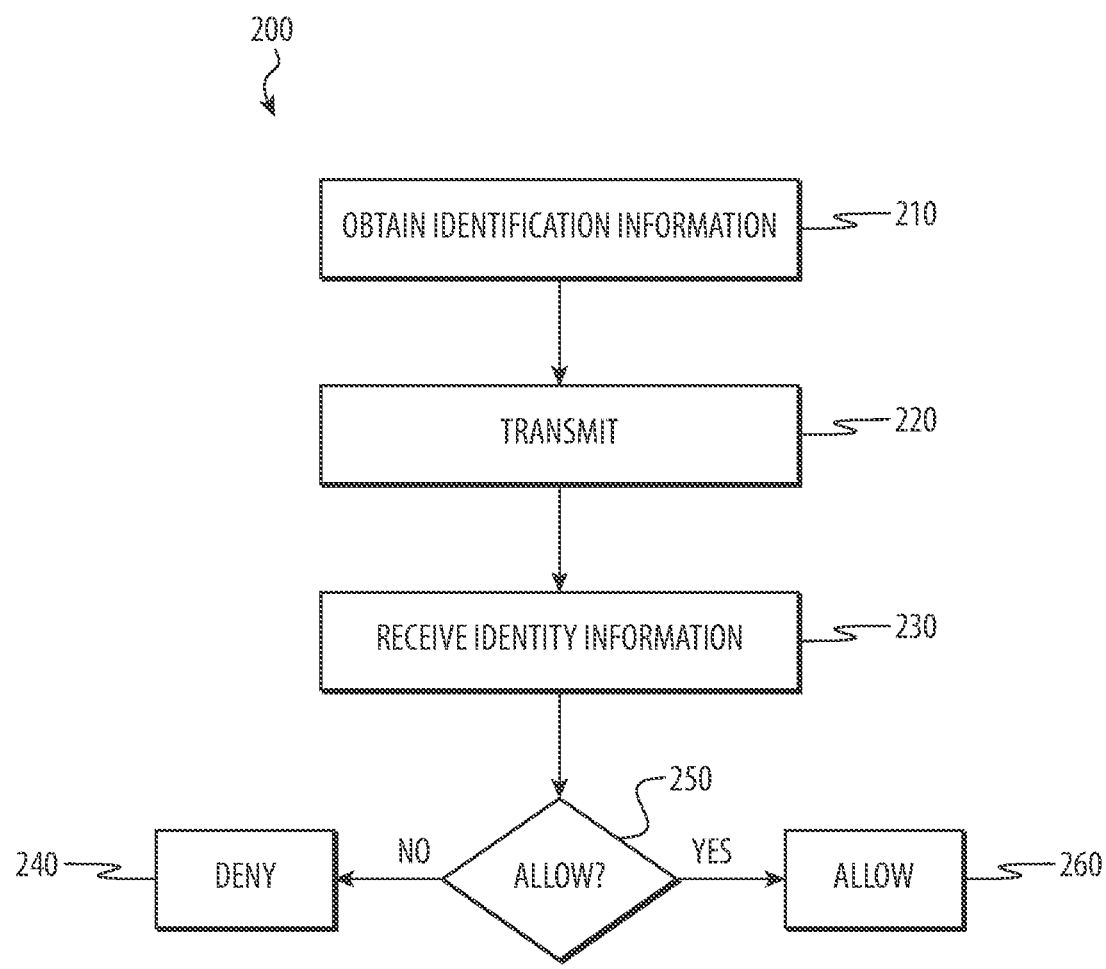
FIG. 2 depicts a flow chart illustrating a first example method for authorizing a mobile identity information controlled device. This method may be performed by the system of FIG. 1.

FIG. 2 depicts a flow chart illustrating a first example method 200 for authorizing a mobile identity information controlled device. This method 200 may be performed by the system 100 of FIG. 1.

At operation 210, an electronic device may obtain identification information. In some examples, the identification information may be at least one digital representation of a biometric obtained via a biometric reader device. The digital representation of the biometric may be a digital representation of a fingerprint, a voiceprint, a facial image, a retina image, an iris image, a deoxyribonucleic acid sequence, a heart rhythm, a gait, and so on. The biometric reader device may be a fingerprint scanner, an optical fingerprint scanner, a phosphorescent fingerprint scanner, a time-of-flight sensor, a camera, an image sensor, a saliva sensor, a deoxyribonucleic acid sensor, a heart rhythm monitor, a microphone, and so on.

At operation 220, the electronic device may transmit the identification information to one or more identity system devices. In some examples, the electronic device may transmit the identification information via one or more intermediate devices. For example, the electronic device may use a short-range communication unit (such as a near-field communication unit, a Bluetooth communication unit, a Bluetooth Low Energy communication unit, and so on) to transmit the identification information to an intermediate device that in turn communicates with an identity system device using a long-range communication unit (such as a WiFi communication unit, a cellular communication unit, and so on).

At operation 230, the electronic device may receive identity information (such as a verified age of a person, a status of the person's driver's license, and so on). The electronic device may receive the identification information from an identity system device and/or an intermediate device in response to transmitting the identification information.

At operation 250, the electronic device may use the identity information to determine whether or not to allow operation (whether full operation, partial operation, and so on) of the electronic device and/or an associated electronic device. If not, the flow may proceed to operation 240 where the electronic device may deny operation. Otherwise, the flow may proceed to operation 260 where the electronic device allows the operation.

For example, a desktop computing device may include a video streaming application. The desktop computing device may receive login information for an associated account and transmit the login information to an identity system device. The identity system device may use the login information to determine whether or not there is payment record identity information indicating payment of a subscription fee for the video streaming application. If so, the identity system device may return an attestation indicating that the subscription fee was paid and the desktop computing device may allow operation of the video streaming application. Otherwise, the desktop computing device may deny operation of the video streaming application, but may allow operation of one or more other applications.

In various examples, this example method 200 may be implemented as a group of interrelated software modules or components that perform various functions discussed herein. These software modules or components may be executed within a cloud network and/or by one or more computing devices, such as the electronic device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as the electronic device receiving the identity information. However, it is understood that this is an example. In some implementations, the electronic device may instead receive one or more attestations regarding the identity information.

For example, the electronic device may receive an indication that the person meets a threshold age (such as 18, 21, and so on), is legally allowed to operate a vehicle, and so on. Various configurations are possible and contemplated without departing from the scope of the present disclosure.

In various implementations, there may be multiple tiers of authorizations for a mobile identity information controlled device. For example, tiers may include a tier for authorization to use all functions and/or components of a mobile identity information controlled device and full authorization to grant authorization to others, a tier for authorization to use a subset of functions and/or components of a mobile identity information controlled device and/or partial authorization to grant authorization to others, a tier for authorization to use all or a subset of functions and/or components of a mobile identity information controlled device but not authorization to grant authorization to others, a tier for authorization to grant authorization to others but not use all or a subset of functions and/or components of a mobile identity information controlled device, a tier for temporary authorization to either use all or a subset of functions and/or components of a mobile identity information controlled device and/or grant authorization to others, a tier for authorization under certain conditions (such as between certain hours, during daylight, when school is not in session, and so on). In some implementations, a person who has a higher tier of authorization may voluntarily restrict themselves to a lower tier in order to restrict his own use of the mobile identity information controlled device. Various configurations are possible and contemplated without departing from the scope of the present disclosure.

Figure 3:
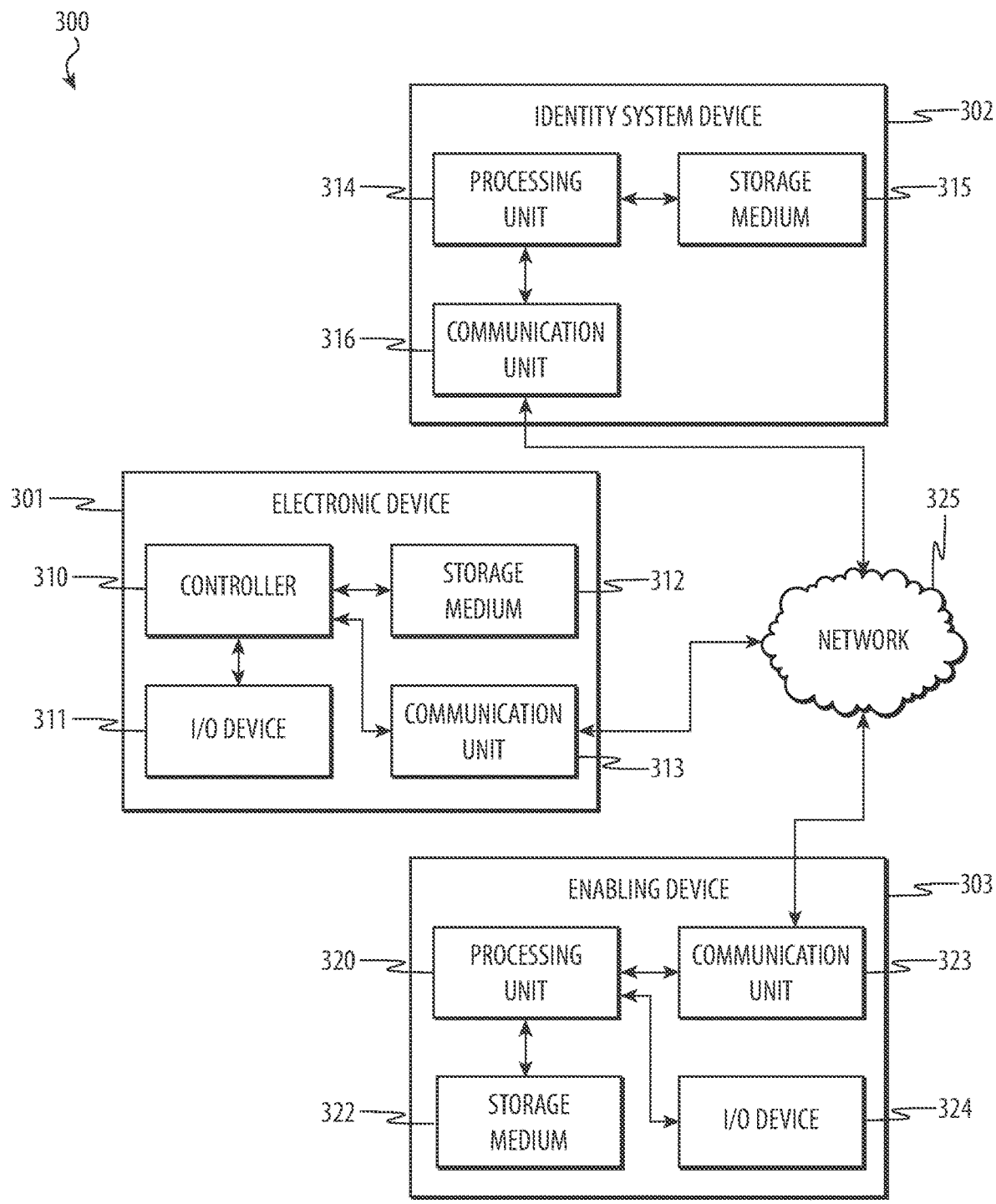
FIG. 3 depicts a second example system for authorizing a mobile identity information controlled device.

FIG. 3 depicts a second example system 300 for authorizing a mobile identity information controlled device. The system 300 may include an enabling device 303 that may communicate with an electronic device 301 and/or an identity system device 302 via one or more communication networks 325.

The enabling device 303 may include one or more processing units 320, non-transitory storage media 322, communication units 323, input/output devices 324, and/or other components. Similarly, the electronic device 301 may include one or more controllers 310, non-transitory storage media 312, communication units 313, input/output devices 311, and/or other components. Likewise, the identity system device 302 may include one or more processing units 314, non-transitory storage media 315, communication units 316, and/or other components.

The processing unit 320 of the enabling device 303 may execute one or more instructions stored in the non-transitory storage medium 322 to perform various functions. For example, the processing unit 320 may receive identification information via the input/output device 324, transmit the identification information to the identity system device 302 via the communication unit 323, receive identity information from the identity system device 302 via the communication unit 323, determine whether to allow or refuse operation of the electronic device 301 using the identification information, and transmit one or more authorization, deauthorization, and/or other signals to the electronic device 301 via the communication unit 323.

Figure 4:
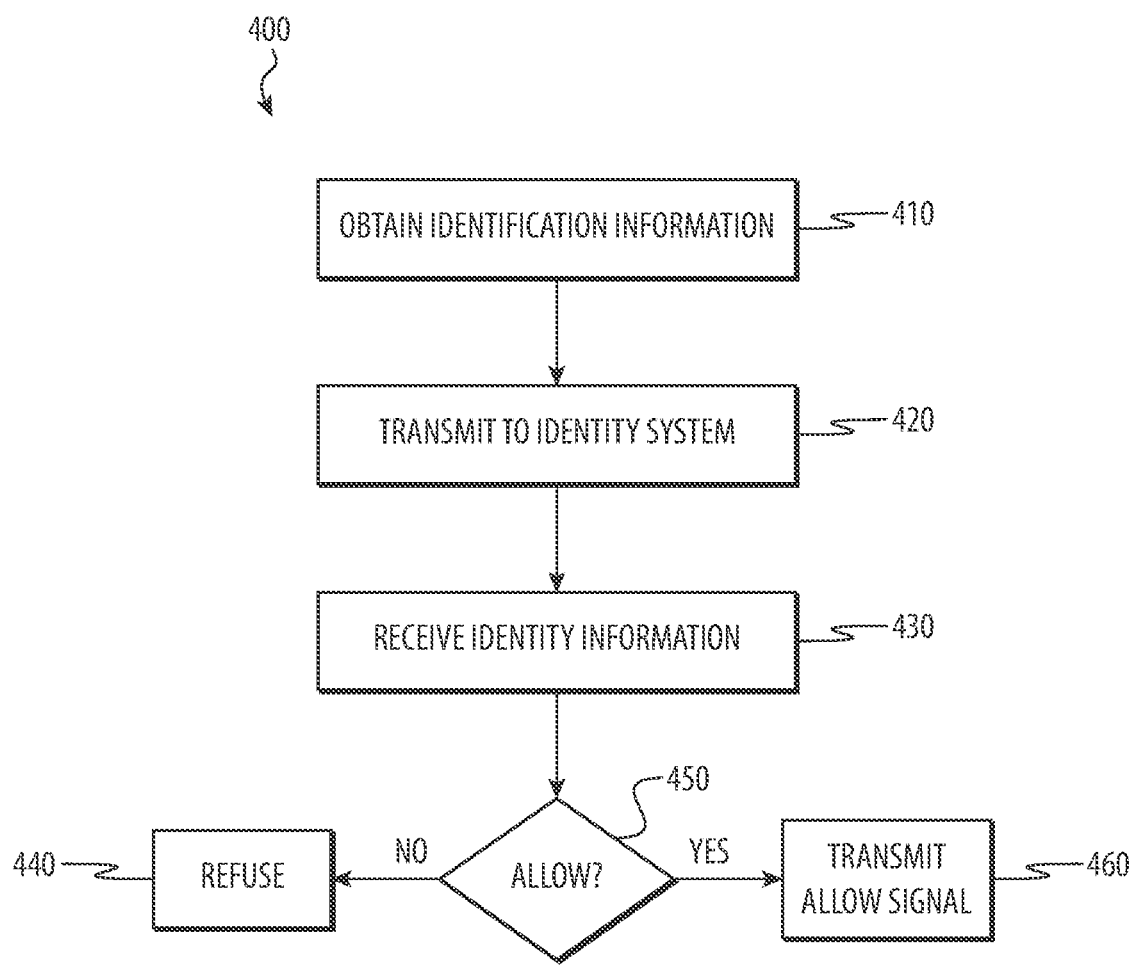
FIG. 4 depicts a flow chart illustrating a second example method for authorizing a mobile identity information controlled device. This method may be performed by the system of FIG. 3.

FIG. 4 depicts a flow chart illustrating a second example method 400 for authorizing a mobile identity information controlled device. This method 400 may be performed by the system 300 of FIG. 3.

At operation 410, an electronic device may obtain identification information. At operation 420, the electronic device may transmit the identification information to an identity system. At operation 430, the electronic device may receive identity information from the identification system in response to transmitting the identification information.

At operation 450, the electronic device may determine whether or not to allow operation of an associated electronic device using the identity information. If not, the flow may proceed to operation 440 where the electronic device may refuse to allow operation of the associated electronic device. Otherwise, the flow may proceed to operation 460 where the electronic device may transmit an allow signal to the associated electronic device.

Upon receipt of the allow signal, the associated electronic device may allow operation.

For example, a smart phone may be configured to operate as an enabling device for a digital media player. The digital media player may be configured with a short-range communication unit, such as a Bluetooth communication unit, but may not have a long-range communication unit. The smart phone may be configured with both a short-range communication unit and a long-range communication unit, such as a WiFi communication unit or a cellular communication unit. An identity system device may be accessible using a long-range communication unit, but not a short-range communication unit. However, the smart phone and the digital media player may be operable to communicate using a short-range communication unit. As such, the smart phone may be configured to communicate with the identity system device on behalf of the digital media player to authorize operation to make up for the inability of the digital media player to communicate directly. The smart phone may obtain identification information, communicate with the identity system device using the long-range communication unit, and communicate with the digital media player using the short-range communication unit to authorize operation (if appropriate).

In various examples, this example method 400 may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 400 is illustrated and described as including particular operations performed in a particular order, it is understood that this is an example. In various implementations, various orders of the same, similar, and/or different operations may be performed without departing from the scope of the present disclosure.

For example, the above illustrates and describes the electronic device obtaining the identification information. However, it is understood that this is an example. In some implementations, the electronic device may receive the identification information from the same device to which the electronic device transmits the allow signal. Various configurations are possible and contemplated without departing from the scope of the present disclosure.

Figure 5:
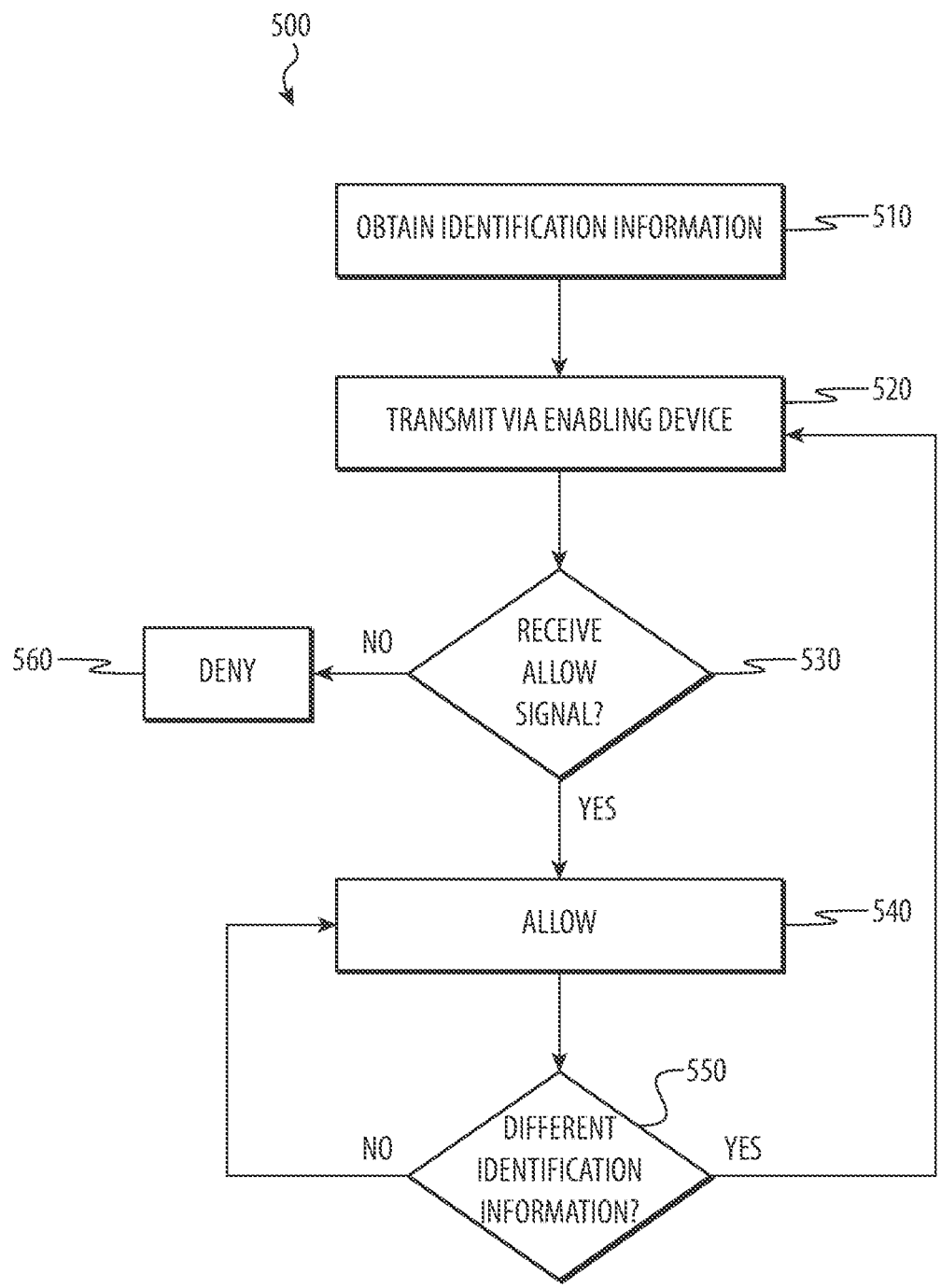
FIG. 5 depicts a flow chart illustrating a third example method for authorizing a mobile identity information controlled device. This method may be performed by the system of FIG. 3.

FIG. 5 depicts a flow chart illustrating a third example method 500 for authorizing a mobile identity information controlled device. This method 500 may be performed by the system 300 of FIG. 3.

At operation 510, an electronic device may obtain identification information. At operation 520, the electronic device may transmit the identification information via an enabling device. At operation 530, the electronic device may determine whether or not an allow signal is received. For example, the allow signal may be received from the enabling device. If so, the flow may proceed to operation 540 where the electronic device may allow operation. Otherwise, the flow may proceed to operation 560 where the electronic device may deny operation.

After the electronic device allows operation at operation 540, the flow may proceed to operation 550 where the electronic device determines whether or not different identification information is received. If so, the flow may proceed to operation 520 where the electronic device transmits the different identification information via an enabling device. Otherwise, the flow may return to operation 540 where the electronic device may continue to allow operation.

For example, a digital media player may be configured to use a smart phone as an enabling device. The digital media player may be configured to obtain a digital representation of a biometric of a person and transmit the digital representation of the biometric to the smart phone. The smart phone may be configured to transmit the received digital representation of the biometric to an identity system device and receive information back indicating whether or not the person is at least 18 years of age. If so, the smart phone may transmit an allow signal to the digital media player to allow operation of the digital media player to present R rated content and/or other content restricted to people who are 18 years of age or more.

In various examples, this example method may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as obtaining the identification information and transmitting such to the enabling device. However, in some implementations, the enabling device may obtain the identification information, transmit the identification information to one or more identity system devices, and transmit one or more allow or deny signals to one or more associated electronic devices accordingly. Various configurations are possible and contemplated without departing from the scope of the present disclosure.

Figure 6:
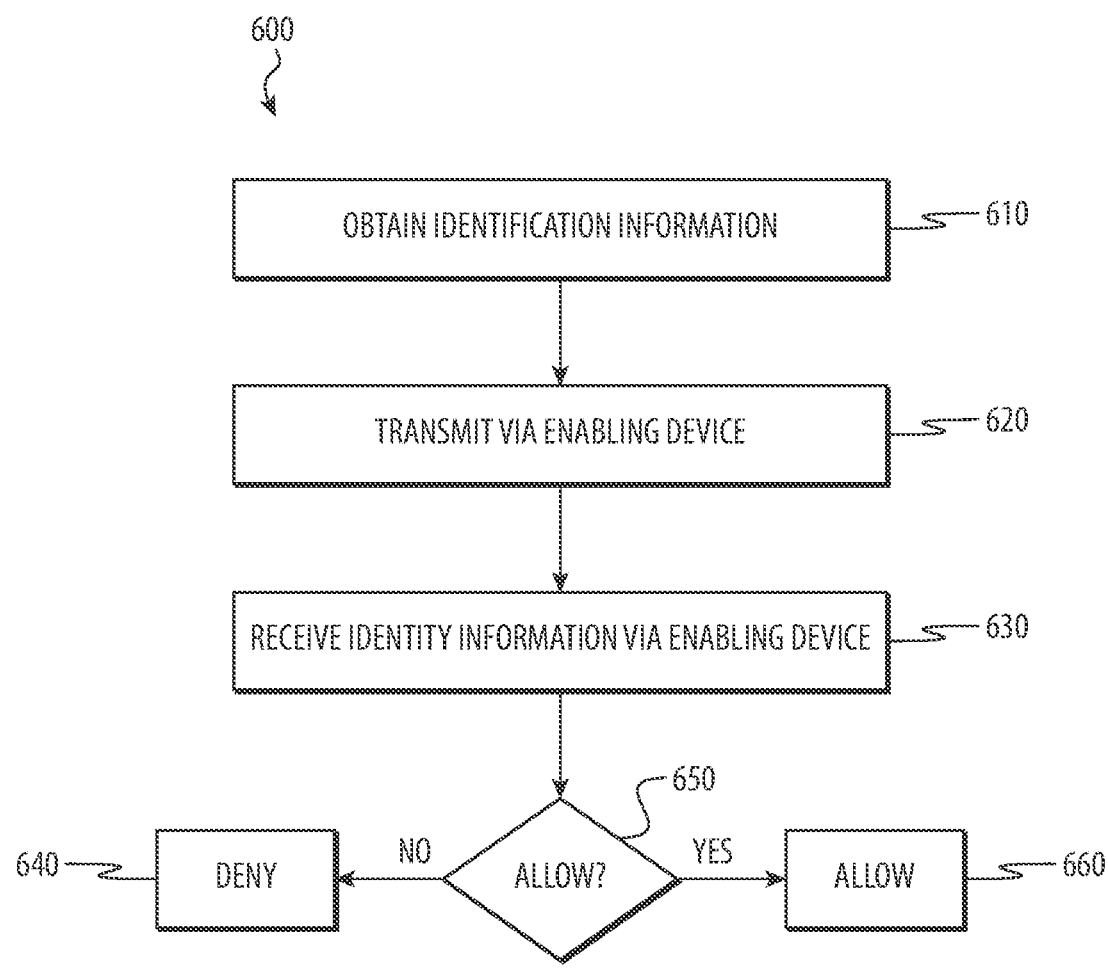
FIG. 6 depicts a flow chart illustrating a fourth example method for authorizing a mobile identity information controlled device. This method may be performed by the system of FIG. 3.

FIG. 6 depicts a flow chart illustrating a fourth example method 600 for authorizing a mobile identity information controlled device. This method 600 may be performed by the system 300 of FIG. 3.

At operation 610, an electronic device may obtain identification information. At operation 620, the electronic device may transmit the identification information via an enabling device. For example, the electronic device may transmit the identification information to an identity system device via the enabling device. At operation 630, the electronic device may receive identity information via the enabling device. For example, the electronic device may receive the identity information from an identity system device via the enabling device, such as in response to transmitting the identification information via the enabling device. The flow may then proceed to operation 650 where the electronic device determines whether or not to allow operation using the identity information. If so, the flow may proceed to operation 660 where the electronic device may allow operation. Otherwise, the flow may proceed to operation 640 where the electronic device may deny operation.

For example, the electronic device may be a vehicle. The vehicle may use a satellite navigation component associated with the vehicle to communicate with an identity system device. The vehicle may capture an image of a person's face, use the satellite navigation component to transmit a digital representation of the image to an identity system device, and receive information back from the identity system device via the satellite navigation component regarding whether or not the person is authorized to operate the vehicle.

In various examples, this example method 600 may be implemented as a group of interrelated software modules or components that perform various functions discussed herein. These software modules or components may be executed within a cloud network and/or by one or more computing devices, such as the electronic device 301 and/or the enabling device 303 of FIG. 3.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as using the same enabling device to transmit the identification information and receive the identity information. However, it is understood that this is an example. In some implementations, multiple enabling devices (such as different enabling devices used to transmit and receive information) may be used. Various configurations are possible and contemplated without departing from the scope of the present disclosure.

Further, the method 600 is illustrated and described as either allowing or denying operation. However, in some examples of various implementations, the electronic device may allow and/or deny operation of different functions or components of the electronic device instead of allowing and/or denying all operation. Various configurations are possible and contemplated without departing from the scope of the present disclosure.

Figure 7:
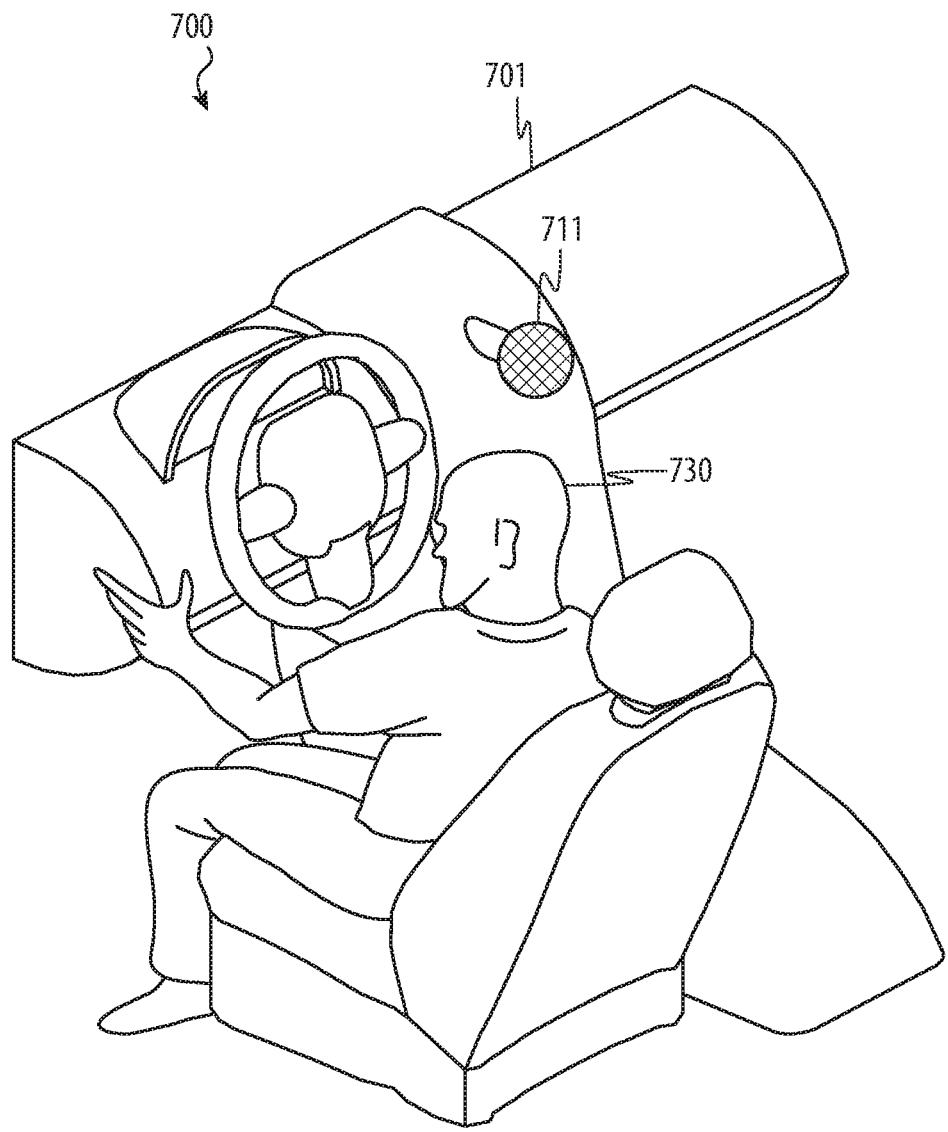
FIG. 7 depicts a third example system for authorizing a mobile identity information controlled device.

FIG. 7 depicts a third example system 700 for authorizing a mobile identity information controlled device. In this example, the system 700 may include a vehicle 701 that includes a microphone 711. The vehicle 701 may use the microphone 711 to obtain a digital representation of the voice of a person 730, transmit the digital representation of the voice to one or more identity system devices, receive information in return regarding whether or not the person is authorized to operate the vehicle, and allow and/or deny operation accordingly.

For example, the person may be authorized to operate the vehicle 701 if the person is at least 16 years of age, has a valid driver's license, has insurance that covers the vehicle 701, owns the vehicle 701, has a valid rental contract for the vehicle 701, is on a permitted operator list for the vehicle 701, and so on. In some examples, the person may be authorized for some operation of the vehicle 701 but not others and the vehicle 701 may allow and/or deny accordingly. By way of illustration, a driver who is 16 years of age may be permitted to drive the vehicle 701 but not use the radio while doing so. By way of another illustration, a person may be allowed to use the radio and/or climate control systems, but may not be allowed to drive. By way of another illustration, a person may be allowed to drive the vehicle 701 in certain areas but not others, at certain times but not others, at certain speeds but not others, and so on.

Various configurations are possible and contemplated without departing from the scope of the present disclosure.

As described above, in various implementations, there may be multiple tiers of authorizations. For example, a parent may have full authorization to use the vehicle at any time, under any conditions, and full authorization to grant authorization to others. The parent may grant a more limited set of authorizations to a child, such as authorization to use the vehicle to drive between home and work, before dark, when school is not in session, for a temporary time (such as for the next five hours so the child can take the vehicle to go see a movie) and so on. The child may not have authorization to grant authorization to use the vehicle to others. Various configurations are possible and contemplated without departing from the scope of the present disclosure.

Figure 8:
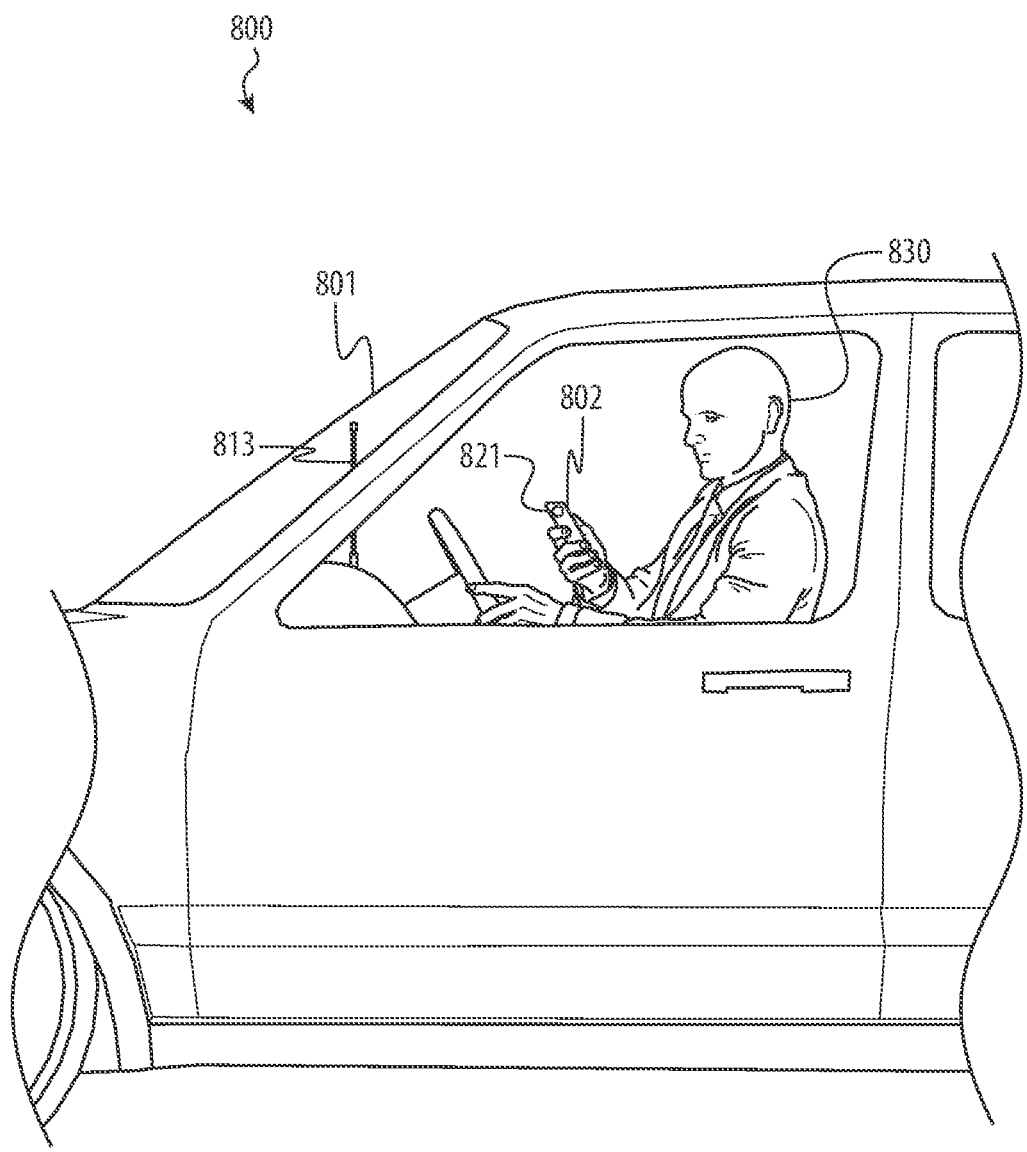
FIG. 8 depicts a fourth example system for authorizing a mobile identity information controlled device.

FIG. 8 depicts a fourth example system 800 for authorizing a mobile identity information controlled device. In this example, the system 800 may include a vehicle 801 that includes an antenna 813. A person 830 may have a mobile communication device 802 that includes a time-of flight sensor or other image sensor, such as a camera 821. The mobile communication device 802 may be operable to capture an image of the face of the person 830, transmit a digital representation of the face to an identity system device, receive identity information (that may indicate various information related to whether or not the person is authorized to use the vehicle 801), and transmit an allow and/or deny signal regarding operation of the vehicle 801 to the vehicle 801 via the antenna 813 using the identity information.

Figure 9:
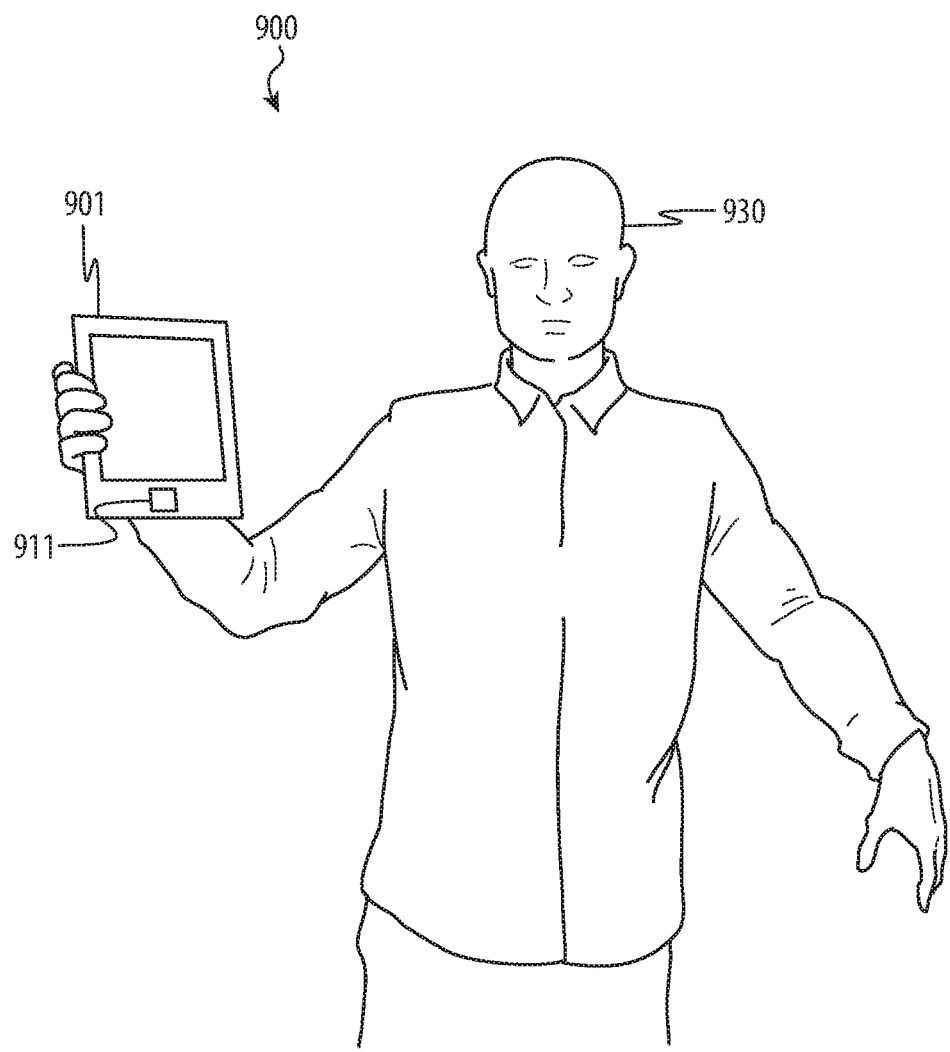
FIG. 9 depicts a fifth example system for authorizing a mobile identity information controlled device.

FIG. 9 depicts a fifth example system 900 for authorizing a mobile identity information controlled device. In this example, the system 900 may include a portable movie player 901 that includes a fingerprint sensor 911. The portable movie player 901 may be operable to receive a digital representation of a fingerprint of a person 930 using the fingerprint sensor 911, transmit the digital representation of the fingerprint to an identity system device, receive identity information from the identity system device regarding whether or not the person 930 has been granted permission to access movie content, and allow and/or deny operation to access movie content accordingly.

As described above, in various implementations, there may be multiple tiers of authorizations. For example, a parent may have full authorization to view any movie. The parent may grant a more limited set of authorizations to a child, such as authorization to see certain movies but not others, to see movies that have less than a particular rating (such as an 'R' rating), to see movies during certain hours (like between 5 and 8, when school is not in session, and so on), to see entertainment movies after watching educational movies, and so on. Various configurations are possible and contemplated without departing from the scope of the present disclosure.

Figure 10:
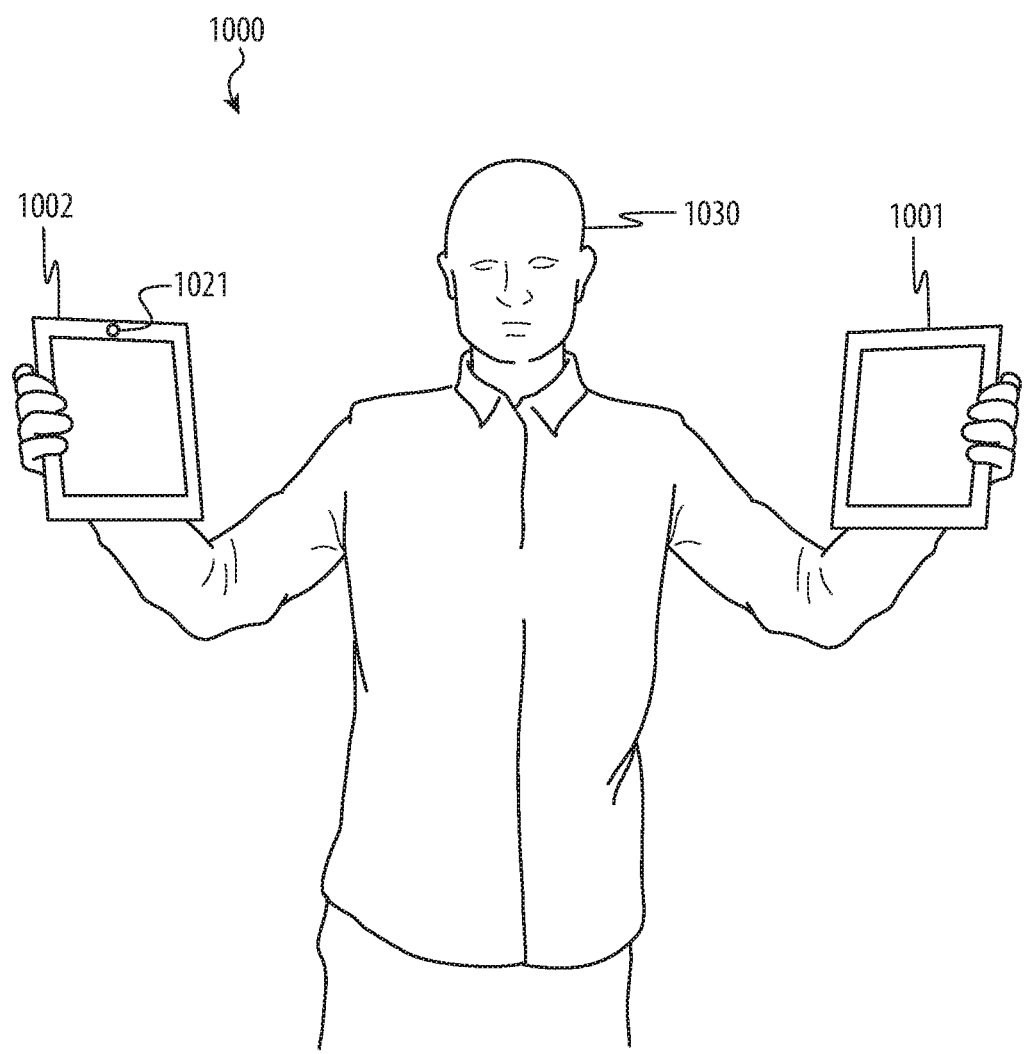
FIG. 10 depicts a sixth example system for authorizing a mobile identity information controlled device.

FIG. 10 depicts a sixth example system 1000 for authorizing a mobile identity information controlled device. In this example, the system 1000 may include a digital media player 1001 and a tablet computing device 1002 that includes a time-of flight sensor or other image sensor, such as a camera 1021. The tablet computing device 1002 may be operable to receive a digital representation of a face of a person 1030 using the camera 1021, transmit the digital representation of the face to an identity system device, receive identity information from the identity system device regarding whether or not the person 1030 has paid to access content, and transmit a signal to the digital media player 1001 to allow and/or deny operation of the digital media player 1001 and to access the content accordingly.

Figure 11:
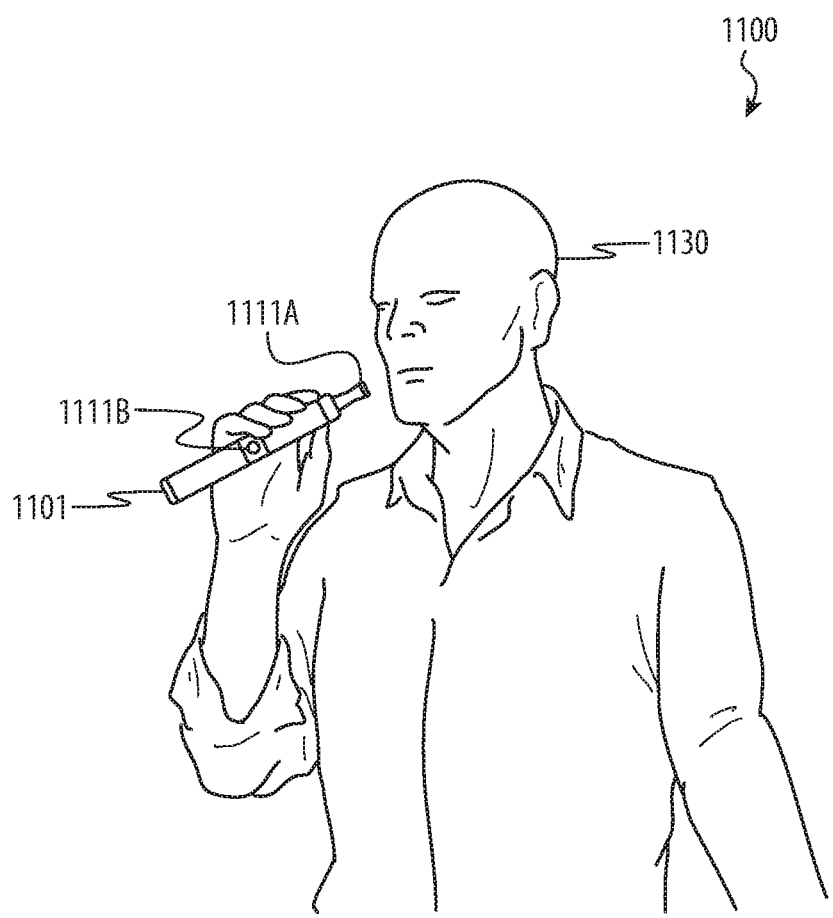
FIG. 11 depicts a seventh example system for authorizing a mobile identity information controlled device.

FIG. 11 depicts a seventh example system 1100 for authorizing a mobile identity information controlled device. In this example, the system 1100 may include a vaporizer 1101 with a saliva detector 1111A and a button 1111B. The vaporizer 1101 may be operable to obtain a digital representation of a deoxyribonucleic acid sequence for a person 1130 (and/or information that may be used to determine such) when the person 1130 puts the saliva detector 1111A to the mouth of the person 1130 and presses the button 1111B. The vaporizer 1101 may transmit the digital representation of the deoxyribonucleic acid sequence to an identity system device and receive an age of the person 1130 in response. The vaporizer 1101 may allow operation accordingly, such as allowing operation of the vaporizer 1101 if the person is at least 18 years of age.

In various embodiments, the vaporizer 1101 may reobtain the digital representation of the deoxyribonucleic acid sequence every time the vaporizer 1101 is operated. If the digital representation of the deoxyribonucleic acid sequence and/or the age of the person 1130 is not reobtained, the vaporizer 1101 may deauthorize operation. This may prevent the person 1130 from authorizing operation and then providing the vaporizer 1101 to another person.

In other embodiments, the vaporizer 1101 may reobtain the digital representation of the deoxyribonucleic acid sequence upon the occurrence of a condition, such as refilling or recharging of the vaporizer 1101, movement of the vaporizer 1101 outside of a geographic area (such as movement of over a mile, outside of a one block range, and so on), expiration of a time period, receipt of a deauthorization signal from another electronic device, detection of a different deoxyribonucleic acid sequence using the saliva detector 1111A, and so on.

In various embodiments, the vaporizer 1101 may store the digital representation of the deoxyribonucleic acid sequence after authorization. In such embodiments, the vaporizer 1101 may obtain and compare a digital representation of the deoxyribonucleic acid sequence to the stored one each time the vaporizer 1101 is operated. Upon a mismatch, the vaporizer 1101 may transmit the newly obtained digital representation of the deoxyribonucleic acid sequence to the identity system device to ensure that it is associated with identity information for a person who is at least 18 years of age. If not, the vaporizer 1101 may deauthorize operation.

Figure 12:
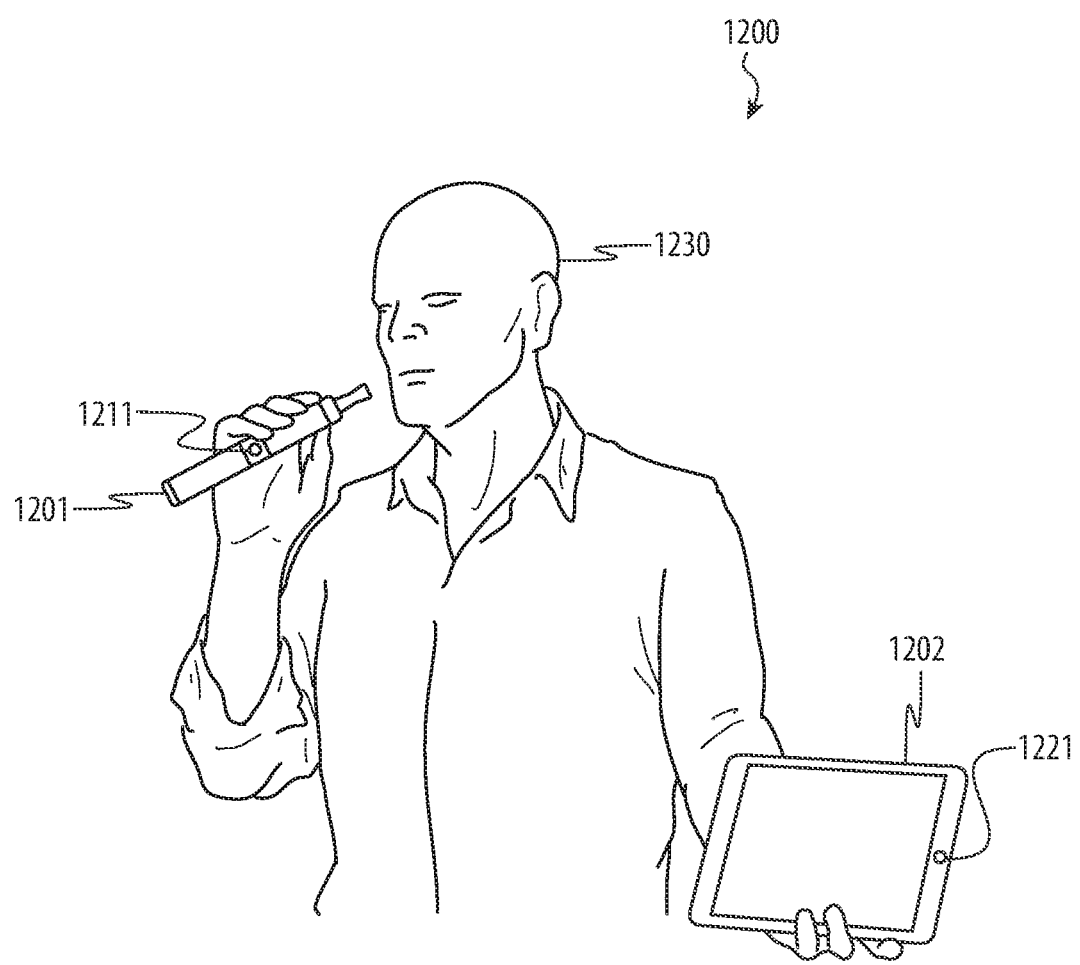
FIG. 12 depicts an eighth example system for authorizing a mobile identity information controlled device.

FIG. 12 depicts an eighth example system 1200 for authorizing a mobile identity information controlled device. In this example, the system 1200 may include a vaporizer 1201 and a tablet computing device 1202. The vaporizer 1201 may include a button 1211 and the tablet computing device 1202 may include a time-of flight sensor or other image sensor, such as a camera 1221.

The tablet computing device 1202 may be operable to capture an image of a face of a person 1230 using the camera 1221 and transmit a digital representation of the image to an identity system device. The tablet computing device 1202 may also be operable to receive an age of the person 1230 from the identity system device and transmit an authorization signal to the vaporizer 1201 if the person 1230 is at least 18 years of age. The button 1211 of the vaporizer 1201 may be operable to activate the vaporizer 1201 only if the vaporizer 1201 has received an authorization signal.

Alternatively, the tablet computing device 1202 may transmit the age of the person 1230 to the vaporizer 1201. In such an example, the vaporizer 1201 may allow operation if the person 1230 is at least 18 years of age. Various configurations are possible and contemplated without departing from the scope of the present disclosure.

In various embodiments, the tablet computing device 1202 may reobtain the digital representation of the image upon the occurrence of a condition, such as refilling or recharging of the vaporizer 1201, expiration of a time period, receipt of a deauthorization signal from another electronic device, detection of a different image of a person's face, movement of the vaporizer 1201, alteration of the vaporizer 1201, expiration of a time period, interruption of a communication connection between the vaporizer 1201 and the tablet computing device 1202, travel of the vaporizer 1201 and the tablet computing device 1202 away from each other, and so on.

For example, after authorization, the vaporizer 1201 may remain authorized as long as the vaporizer 1201 is within 100 feet of the tablet computing device 1202. If the vaporizer 1201 is more than 100 feet away from the tablet computing device 1202, the vaporizer 1201 may deauthorize operation until the vaporizer 1201 receives a signal to reauthorize. Various configurations are possible and contemplated without departing from the scope of the present disclosure.

As described above, in various implementations, there may be multiple tiers of authorizations for a mobile identity information controlled device. In some examples, a person who has a higher tier of authorization may voluntarily restrict themselves to a lower tier in order to restrict his own use of the vaporizer 1201. By way of illustration, the person may restrict his use of the vaporizer 1201 to a certain amount of use per day (such as twenty times a day, five times a day, and so on), to a certain frequency of use (such as once per hour, at least two hours between uses, and so on), to use in certain places but not others (such as at work but not at home, at the gym, and so on), and so on. Various configurations are possible and contemplated without departing from the scope of the present disclosure.

Figure 13:
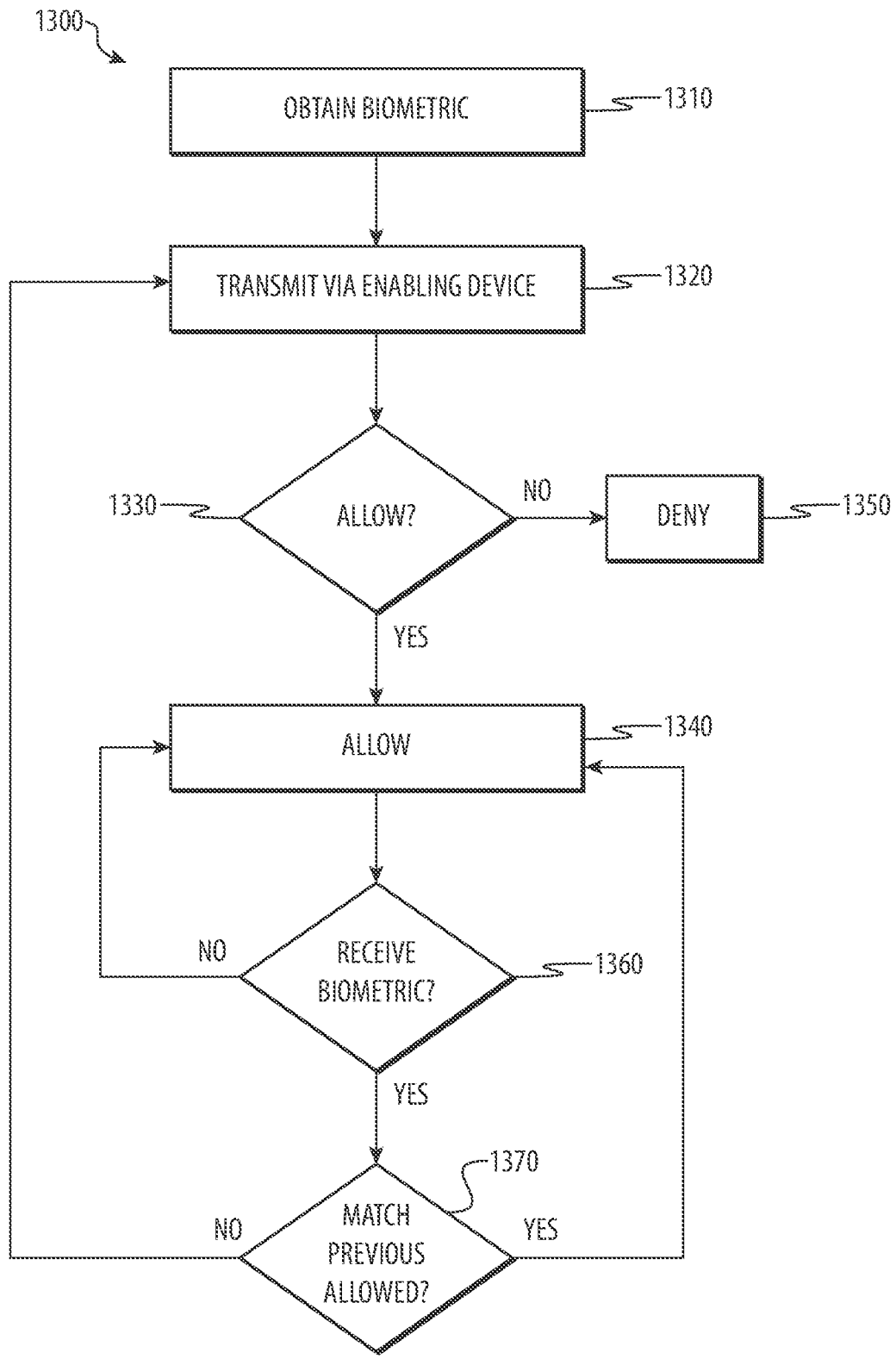
FIG. 13 depicts a flow chart illustrating a fifth example method for authorizing a mobile identity information controlled device. This method may be performed by one or more of the systems of FIGS. 7-12.

FIG. 13 depicts a flow chart illustrating a fifth example method 1300 for authorizing a mobile identity information controlled device. This method 1300 may be performed by one or more of the systems 700-1200 of FIGS. 7-12.

At operation 1310, an electronic device may obtain a digital representation of a biometric. The electronic device may obtain the digital representation of the biometric by capturing the digital representation of the biometric via an integrated biometric reader device, receiving the digital representation of the biometric from another device that includes a biometric reader device, and so on.

At operation 1320, the electronic device may transmit the digital representation of the biometric via an enabling device. The electronic device may transmit the digital representation of the biometric to one or more identity system devices via the enabling device. In some examples, the enabling device may communicate with the electronic device and the identity system device using different communication media and/or different communication units.

At operation 1330, the electronic device may determine whether or not to allow operation using identity information obtained from the identity system device using the digital representation of the biometric. For example, the electronic device may receive the identity information and determine whether or not to allow operation. By way of another example, the electronic device may receive one or more signals indicating whether or not to allow operation. Such signals may be received from one or more devices that obtained the identity information and determined the appropriate signal to transmit using the identity information. If the electronic device determines to allow operation, the flow may proceed to operation 1340 where the electronic device may allow operation. Otherwise, the flow may proceed to operation 1350 where the electronic device may deny operation.

After the electronic device allows operation, the flow may proceed to operation 1360 where the electronic device may determine whether or not a digital representation of a biometric is received and/or otherwise obtained. If not, the flow may return to operation 1340 where the electronic device continues to allow operation. Otherwise, the flow may proceed to operation 1370 where the electronic device compares the new digital representation of the biometric to the previous digital representation of the biometric. If there is a match, the flow may return to operation 1340 where the electronic device continues to allow operation. Otherwise, the flow may return to operation 1320 where the electronic device may transmit the new digital representation of the biometric via the enabling device.

In various examples, this example method 1300 may be implemented as a group of interrelated software modules or components that perform various functions discussed herein. These software modules or components may be executed within a cloud network and/or by one or more computing devices, such as one or more of the devices illustrated in FIGS. 7-12.

Although the example method 1300 is illustrated and described as including particular operations performed in a particular order, it is understood that this is an example. In various implementations, various orders of the same, similar, and/or different operations may be performed without departing from the scope of the present disclosure.

For example, the method 1300 is illustrated and described as denying operation at 1350. However, in various examples, the flow may instead return to operation 1310 where the electronic device waits to obtain a different digital representation of a biometric. Various configurations are possible and contemplated without departing from the scope of the present disclosure.

Figure 14:
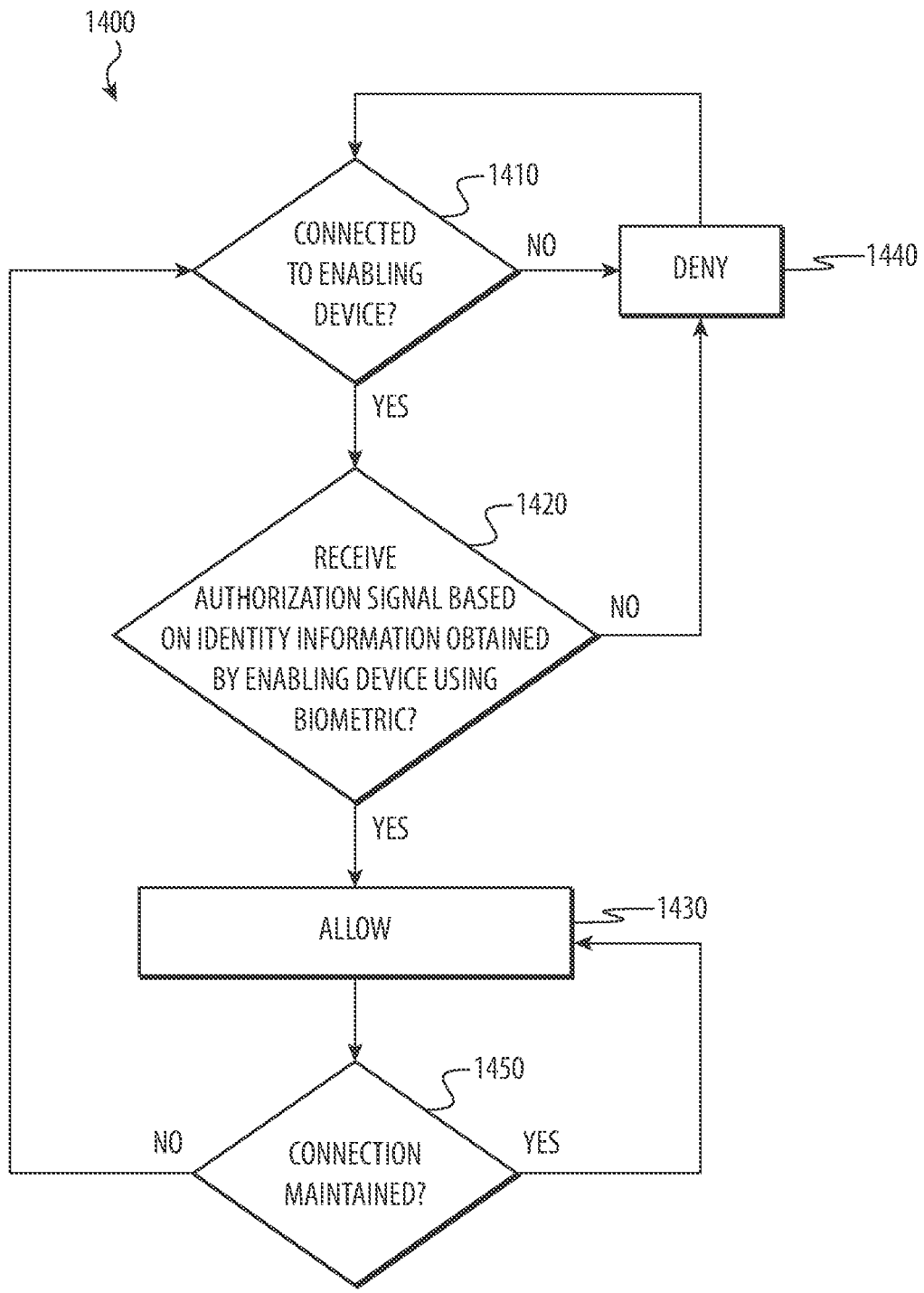
FIG. 14 depicts a flow chart illustrating a sixth example method for authorizing a mobile identity information controlled device. This method may be performed by one or more of the systems of FIGS. 7-12.

FIG. 14 depicts a flow chart illustrating a sixth example method 1400 for authorizing a mobile identity information controlled device. This method 1400 may be performed by one or more of the systems 700-1200 of FIGS. 7-12.

At operation 1410, an electronic device may determine whether or not the electronic device is connected to an enabling device via one or more communication media. If not, the electronic device may at operation 1440 deny operation. Otherwise, the flow may proceed to operation 1420.

At operation 1420, after the electronic device determines that the electronic device is connected to an enabling device via one or more communication media, the electronic device may determine whether or not an authorization signal is received that is based on identity information obtained by the enabling device using one or more digital representations of biometrics. If not, the flow may proceed to operation 1440 where the electronic device may deny operation. Otherwise, the flow may proceed to operation 1430 where the electronic device may allow operation.

After the electronic device allows operation, the flow may proceed to operation 1450 where the electronic device may determine whether or not the electronic device maintains the connection to the enabling device via the one or more communication media. If so, the flow may return to operation 1430 where the electronic device may continue to allow operation. Otherwise, the flow may return to operation 1410 where the electronic device may again determine whether or not the electronic device is connected to an enabling device via one or more communication media.

In various examples, this example method 1400 may be implemented as a group of interrelated software modules or components that perform various functions discussed herein. These software modules or components may be executed within a cloud network and/or by one or more computing devices, such as one or more of the devices illustrated in FIGS. 7-12.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 is illustrated and described as determining whether or not an authorization signal is received before allowing operation. However, in various implementations, the electronic device may receive the identity information itself and determine whether or not to authorize operation using the identity information. Various configurations are possible and contemplated without departing from the scope of the present disclosure.

In various implementations, a system for authorizing a mobile identity information controlled device may include a non-transitory storage medium that stores instructions, a biometric reader device, at least one communication unit, and a processor. The processor may execute the instructions to communicate with the mobile identity information controlled device using the at least one communication unit; receive at least one digital representation of a biometric using the biometric reader device; obtain identity information from an identity system device, via the at least one communication unit, using the at least one digital representation of the biometric; and determine whether to transmit an authorization signal to the mobile identity information controlled device using the at least one communication unit based on the identity information.

In some examples, the at least one digital representation of the biometric may include a digital representation of at least one of a fingerprint, a voiceprint, a facial image, a retina image, an iris image, a deoxyribonucleic acid sequence, a heart rhythm, or a gait. In a number of examples, the biometric reader device may include at least one of a fingerprint scanner, an optical fingerprint scanner, a phosphorescent fingerprint scanner, a time-of-flight sensor, a camera, an image sensor, a saliva sensor, a deoxyribonucleic acid sensor, a heart rhythm monitor, or a microphone.

In various examples, the at least one communication unit may include a short-range communication unit and a long-range communication unit, the processor may communicate with the mobile identity information controlled device using the short-range communication unit, and the processor may obtain the identity information from the identity system device using the long-range communication unit. In some such examples, the short-range communication unit may include at least one of a near-field communication unit, a Bluetooth communication unit, or a Bluetooth Low Energy communication unit and the long-range communication unit may include a WiFi communication unit or a cellular communication unit.

In a number of examples, the mobile identity information controlled device may be configured to deauthorize after receiving the authorization signal if the communication between the mobile identity information controlled device and the at least one communication unit is interrupted. In various examples, the processor may determine to transmit the authorization signal to the mobile identity information controlled device based on a verified age included in the identity information. In a number of examples, the mobile identity information controlled device may be a vehicle, a vaporizer, or a media player.

In some implementations, a mobile identity information controlled device may include a non-transitory storage medium that stores instructions, a biometric reader device, a communication unit operative to communicate with an enabling device, and a controller. The controller may execute the instructions to receive at least one digital representation of a biometric using the biometric reader device, transmit the at least one digital representation of the biometric to the enabling device using the communication unit, and determine whether to authorize operation of the mobile identity information controlled device based on identity information obtained by the enabling device from an identity system device using the at least one digital representation of the biometric.

In various examples, the at least one digital representation of the biometric may include a first biometric and the controller may be operative to receive a second biometric via the biometric reader device and deauthorize operation of the mobile identity information controlled device when the second biometric mismatches the first biometric. In some such examples, the controller may attempt to reauthorize operation of the mobile identity information controlled device by transmitting the second biometric to the enabling device using the communication unit.

In some examples, the controller may deauthorize operation of the mobile identity information controlled device upon determining that communication with the enabling device is interrupted. In a number of examples, the mobile identity information controlled device may be a vehicle, a vaporizer, or a media player. In various examples, the biometric reader device may include at least one of a fingerprint scanner, an optical fingerprint scanner, a phosphorescent fingerprint scanner, a time-of-flight sensor, a camera, an image sensor, a saliva sensor, a deoxyribonucleic acid sensor, a heart rhythm monitor, or a microphone. In a number of examples, the at least one digital representation of the biometric may include a digital representation of at least one of a fingerprint, a voiceprint, a facial image, a retina image, an iris image, a deoxyribonucleic acid sequence, a heart rhythm, or a gait. In some examples, the communication unit may include at least one of a near-field communication unit, a Bluetooth communication unit, or a Bluetooth Low Energy communication unit.

In various embodiments, a mobile identity information controlled device may include a non-transitory storage medium that stores instructions, a biometric reader device, a communication unit, and a controller. The controller may execute the instructions to receive at least one digital representation of a biometric using the biometric reader device; obtain identity information from an identity system device, via the communication unit, using the at least one digital representation of the biometric; and determine whether to authorize operation of the mobile identity information controlled device based on a verified age included in the identity information.

In some examples, the mobile identity information controlled device may be a vehicle, a vaporizer, or a media player. In a number of examples, the at least one digital representation of the biometric may include a digital representation of at least one of a fingerprint, a voiceprint, a facial image, a retina image, an iris image, a deoxyribonucleic acid sequence, a heart rhythm, or a gait. In various examples, the biometric reader device may include at least one of a fingerprint scanner, an optical fingerprint scanner, a phosphorescent fingerprint scanner, a time-of-flight sensor, a camera, an image sensor, a saliva sensor, a deoxyribonucleic acid sensor, a heart rhythm monitor, or a microphone.

Although the above is illustrated and described in the context of a mobile identity information controlled device, it is understood that these are examples. In various implementations, techniques disclosed herein may be used in the context of electronic devices that are not mobile and/or not easily mobile without departing from the scope of the present disclosure.

For example, in some implementations, the techniques described herein may be used in the context of a smart house and/or other smart building. Authorizations may be granted to access (whether temporarily, conditionally, and so on) part or all of the house and/or use various components included therein. For example, a cleaning service may be granted authorization to enter areas of the smart house that the cleaning service is to clean. By way of another example, a portion of the smart house may be leased for a night to a person and the person may be authorized to enter that portion of the house and/or to use various components of the smart house (such as entry to one bedroom but not another, ability to operate a television but not a stove, and so on). Various configurations are possible and contemplated without departing from the scope of the present disclosure.

As described above, the present application also relates to authorizing a mobile identity information controlled financial account device. This will now be described in detail.

Figure 15:
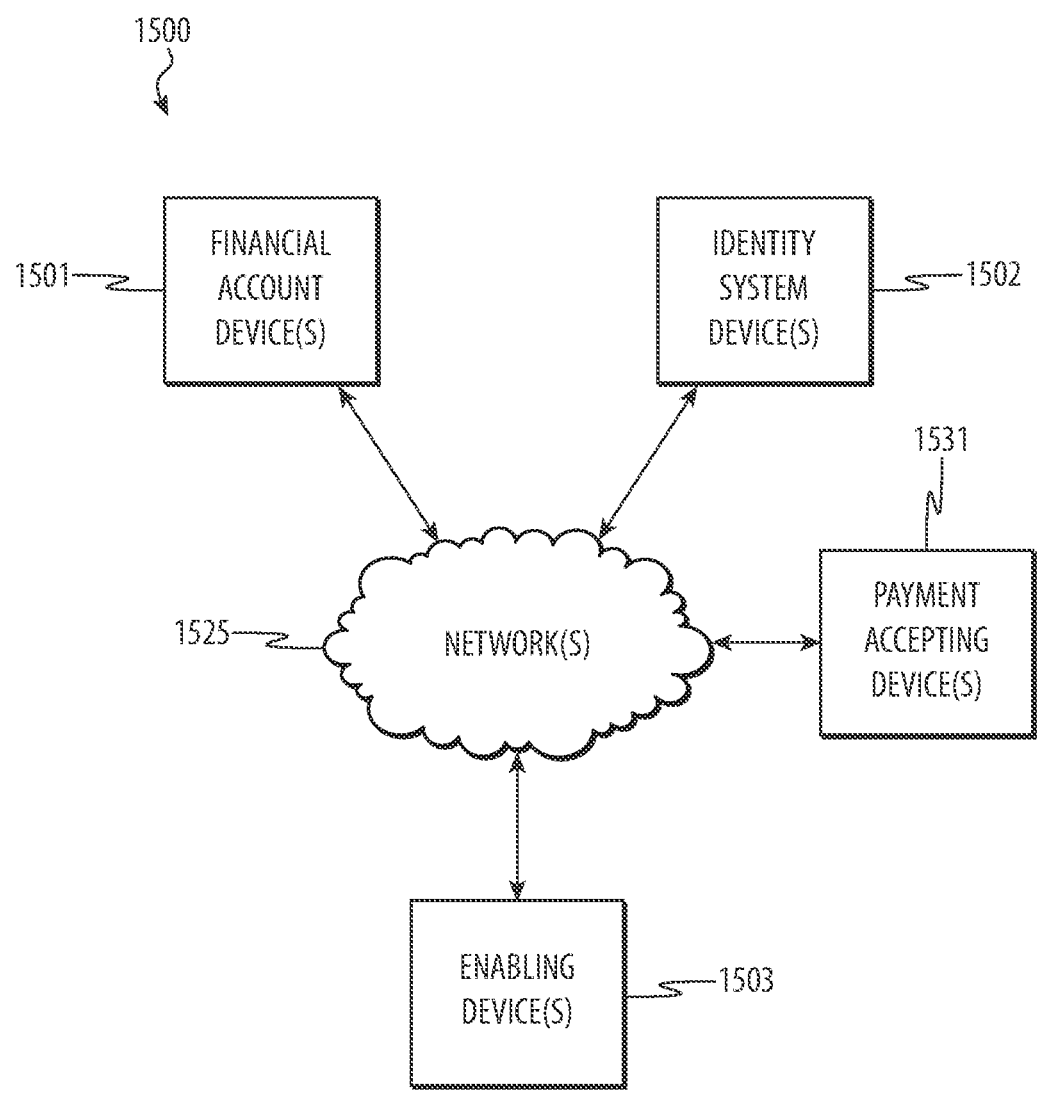
FIG. 15 depicts a first example system for authorizing a mobile identity information controlled financial account device.

FIG. 15 depicts a first example system 1500 for authorizing a mobile identity information controlled financial account device. The system 1500 may include one or more electronic devices (such as one or more identity system devices 1502, enabling devices 1503, payment accepting devices 1531, and so on) that are operable to communicate with one or more financial account devices 1501 (which may be a mobile identity information controlled financial account device) via one or more wired and/or wireless communication networks 1525.

The financial account device 1501 may include any kind of device that may be used to perform one or more functions related to one or more financial accounts. Examples of such devices may include credit cards, debit cards, smart cards, rewards account cards, loyalty account cards, gift cards, mobile and/or other computing devices usable to perform one or more functions related to one or more financial accounts, and so on. Examples of such financial accounts may include one or more credit card accounts, checking accounts, savings accounts, rewards accounts, loyalty accounts, airline miles accounts, insurance accounts, and so on. Examples of functions that may be performed related to one or more financial accounts may include paying for one or more transactions using the one or more financial accounts, updating information related to one or more financial accounts, assigning and/or updating one or more permissions regarding one or more functions that one or more people may perform using one or more financial accounts and/or the financial account device 1501, and so on.

The electronic device may communicate with the financial account device 1501 to authorize the financial account device 1501. The electronic device may receive at least one digital representation of a biometric (such as via a biometric reader device included in and/or separate from the financial account device 1501), obtain identity information using the at least one digital representation of the biometric (such as via the identity system device 1502), and determine whether or not to transmit an authorization signal to the financial account device 1501 that enables use of the financial account device 1501 in at least one transaction involving at least one financial account (such as when the financial account device 1501 is presented to the payment accepting device 1531, which may be associated with the at least one transaction). The financial account device 1501 may be usable for the at least one transaction when the financial account device 1501 receives the authorization signal.

In this way, authorization can be controlled at the financial account device 1501 with a great amount of granularity and fidelity to specific people, for specific transactions, at specific times, and so on as would not otherwise be performable by conventional systems. This may enable a wide variety of functionality beyond determining whether or not a financial account is currently valid and/or whether or not a person claims to have a name and/or provides a signature matching one on a card and/or otherwise associated with a financial account. Further, this may free up systems involving devices that accept payment and/or financial account issuers from having to constantly communicate with each other and/or determine financial account validity. As such, these systems and/or larger systems with which they are involved may operate more efficiently, eliminate redundant components, and/or use less hardware and/or software resources than would otherwise be possible in conventional systems.

For example, in various implementations, the financial account device 1501 may include a payment interface (such as a magnetic strip, a near-field communication (NFC) component, a radio-frequency identification (RFID) tag or chip, and so on) for communicating with the payment accepting device 1531 (which may be a merchant point of sale device and/or other device that is operable to accept payment) and a communication unit that is operable to communicate with an enabling device 1503 (such as a smart phone, mobile computing device, personal electronic device, and/or other electronic device) but inoperable to communicate with the identity system device 1502. However, the enabling device 1503 may include communication units that are operable to communicate with both the financial account device 1501 and the identity system device 1502 (and/or the payment accepting device 1531 and/or other electronic devices) and/or other components (such as one or more batteries and/or other power sources, biometric reader devices, and so on). By way of illustration, the financial account device 1501 may include a short-range communication unit (such as a NFC communication unit, a Bluethooth communication unit, a Bluetooth Low Energy communication unit, and so on) whereas the enabling device 1503 may include both short-range communication units and long-range communication units (such as a Wifi communication unit, a cellular communication unit, and so on). The enabling device 1503 may receive at least one digital representation of a biometric (such as from a biometric reader device included in and/or associated with the financial account device 1501, a biometric reader device included in and/or associated with the enabling device 1503 in situations where a biometric reader device is not included in the financial account device 1501 or where a biometric reader device included in the financial account device 1501 is not to be used, and so on), obtain identity information from the identity system device 1502 using the at least one digital representation of the biometric, and determine whether or not to transmit an authorization signal to the financial account device that enables use of the financial account device 1501 in at least one transaction involving at least one financial account.

By way of another example, the financial account device 1501 may include a non-transitory storage medium that stores instructions, a communication unit operative to communicate with the enabling device 1503, a controller, and/or other components (such as one or more batteries and/or other power sources, biometric reader devices, and so on). The controller may execute the instructions to obtain at least one digital representation of a biometric, transmit the at least one digital representation of the biometric to the enabling device 1503 using the communication unit, and determine whether to authorize use of the financial account device 1501 in at least one transaction involving at least one financial account based on identity information obtained by the enabling device 1503 from the identity system device 1502 using the at least one digital representation of the biometric.

In other examples, the financial account device 1501 may be operable to communicate with the identity system device 1502 directly and the enabling device 1503 may be omitted. In still other examples, the financial account device 1501 and the payment accepting device 1531 may be incorporated into a single device. By way of illustration, the financial account device 1501 and the payment accepting device 1531 may be incorporated into a mobile and/or other computing device that may implement a web browser that is usable to make payments via a payment accepting web site. Various configurations are possible and contemplated without departing from the scope of the present disclosure.

In various examples, the financial account device 1501 may be authorized for each use. In other examples, the financial account device 1501 may remain authorized until receiving a deauthorization signal, for a period of time (such as five minutes, ten hours, and so on), until communication with the financial account device 1501 (such as between the financial account device 1501 and the enabling device 1503) is interrupted, and so on. In still other examples, the financial account device 1501 may remain authorized until a digital representation of a biometric associated with a different person is received (whereupon the financial account device 1501 may be deauthorized and an attempt may be made to reauthorize the financial account device 1501 using the digital representation of the biometric associated with the different person). Various configurations are possible and contemplated without departing from the scope of the present disclosure.

The electronic device that authorizes and/or enables use of the financial account device 1501 in at least one transaction involving at least one financial account may obtain data from the identity information and/or other sources related to one or more persons associated with the at least one digital representation of the biometric, one or more permissions associated with the one or more persons and/or the at least one transaction (such as transaction information received from the payment accepting device 1531, the financial account device 1501, the enabling device 1503, a combination thereof, and so on), a current time or time period, a current location, and/or any other data that may be used to specify whether or not use of the financial account device 1501 in the at least one transaction is to be authorized and/or enabled. By way of illustration, the one or more permissions may restrict at least one of a transaction time, a transaction place, a transaction subject, a transaction amount, an aggregate transaction amount, an aggregate number of transactions, and so on. The one or more permissions may be permanent, permanent until revoked, temporary (such as valid for the next hour, for a week, during banking hours, and so on), and so on.

For example, an electronic device (such as the financial account device 1501, the identity system device 1502, the enabling device 1503, the payment accepting device 1531, and so on) may receive a digital representation of a biometric for a person along with at least one permission regarding the financial account device 1501. Subsequently, the electronic device may determine whether or not to authorize use of the financial account device 1501 based on the at least one permission when the digital representation of the biometric is received.

By way of illustration, a person may specify maximum and aggregate transaction amounts regarding the person's credit card for the time period of a weekend during which the person intends to go out celebrating. As such, the person may not be required to monitor transaction amounts himself. Instead, the credit card may be authorized until one of the maximum amounts is reached, whereupon the person's credit card may not be authorized and/or may be deauthorized.

The system 1500 may also include functionality related to a first person assigning one or more permissions to use the financial account device 1501 to a second person and/or one or more other people. In such an example, an electronic device (such as the financial account device 1501, the identity system device 1502, the enabling device 1503, the payment accepting device 1531, and so on) may receive a first digital representation of a biometric for a first person along with at least one permission to assign regarding the financial account device 1501. The at least one permission may be assigned to a second person. The electronic device may determine whether or not to authorize use of the financial account device 1501 when a second digital representation of a biometric for the second person is received.

For example, the electronic device may include a non-transitory storage medium that stores instructions, at least one biometric reader device, at least one communication unit, and a processor. The processor may execute the instructions to communicate with the financial account device 1501 using the at least one communication unit; receive a first digital representation of a biometric for a first person using the at least one biometric reader device; receive at least one permission from the first person to assign regarding the financial account device 1501; receive a second digital representation of a biometric for a second person using the at least one biometric reader device; obtain identity information from the identity system device 1502, via the at least one communication unit, using the second digital representation of the biometric for the second person; and determine whether to transmit an authorization signal to the financial account device 1501 using the at least one communication unit based on the identity information and the at least one permission wherein the authorization signal enables use of the financial account device 1501 in at least one transaction involving at least one financial account.

By way of illustration, a parent may specify that a child may use the parent's debit card to purchase food items at a specific grocery store between the hours of 4:00 PM and 5:00 PM. This may allow the child to use the parent's debit card to buy a snack at the grocery store on the child's way home from school without enabling the child to purchase other items and/or otherwise use the parent's debit card.

By way of another illustration, an elderly parent may desire assistance of a supervising child in monitoring use of his credit card. The elderly parent may specify that he can approve his own use of his credit card for groceries, gasoline, or similar routine expenses. However, the elderly parent may specify that payments over $1000 and/or to contractors require approval of his supervising child in order to assist the elderly parent in combatting fraud. Upon the elderly parent attempting to use his credit card for such a restricted transaction, the supervising child may be required to provide his biometric and/or contacted to obtain his biometric in order to approve the transaction. In other cases, approval may be specified for any person who has a power of attorney or similar supervisory role for the elderly parent or other person, and the system 1500 may record and/or track the identities of people who have such powers of attorney and/or similar supervisory roles for one or more other identities of other people. Various configurations are possible and contemplated without departing from the scope of the present disclosure.

The system 1500 may also include functionality related to interacting with one or more fraud detection and/or similar services associated with one or more financial accounts. For example, the system 1500 may increase verification measures in response to a fraud detection service communicating a monitored increased fraud risk, such as requiring a biometric until informed of the monitored increased fraud risk and then requiring a biometric and confirmation via message delivered to an associated mobile computing device. By way of another example, the system 1500 may decrease verification measures in response to a fraud detection service communicating a monitored decreased fraud risk, such requiring a biometric and confirmation via message delivered to an associated mobile computing device until informed of the monitored decreased fraud risk and then requiring a biometric without the confirmation via message delivered to the associated mobile computing device.

In some situations, the system 1500 may communicate with the fraud detection and/or similar service to change the monitored fraud risk. For example, use of biometric verification may be communicated to the fraud detection and/or similar service to decrease the monitored fraud risk. By way of another example, facial distress and possible other parties who may be coercing participating in a transaction may be communicated to the fraud detection and/or similar service to increase the monitored fraud risk. In some examples, techniques may be used to contact a person suspected to be coerced to determine if this is the case, such as a message transmitted to an associated electronic device prompting the person to blink twice in order to summon law enforcement. Various configurations are possible and contemplated without departing from the scope of the present disclosure.

The financial account device 1501, the identity system device 1502, the enabling device 1503, and/or the payment accepting device 1531 may each be any kind of device. Examples of such devices include, but are not limited to, one or more desktop computing devices, laptop computing devices, mobile computing devices, wearable devices, tablet computing devices, mobile telephones, smart phones, printers, displays, vehicles, kitchen appliances, vaporizers, entertainment system devices, digital media players, smart houses or other smart buildings, and so on. The financial account device 1501, the identity system device 1502, the enabling device 1503, and/or the payment accepting device 1531 may each include one or more controllers and/or other processors and/or processing units, one or more non-transitory storage media (which may take the form of, but is not limited to, a magnetic storage medium; optical storage medium; magneto-optical storage medium; read only memory; random access memory; erasable programmable memory; flash memory; and so on), one or more communication units, one or more biometric reader devices (such as a fingerprint scanner, an optical fingerprint scanner, a phosphorescent fingerprint scanner, a palm scanner, a vein scanner, a time-of-flight sensor, a camera, an image sensor, a saliva sensor, a deoxyribonucleic acid sensor, a heart rhythm monitor, a microphone, and so on) that are operable to obtain one or more digital representations of one or more biometrics (such as a hash and/or other digital representation of a fingerprint, a voiceprint, a facial image, a retina image, an iris image, a deoxyribonucleic acid sequence, a heart rhythm, a gait, a palm scan, a vein scan, and so on), one or more batteries and/or other power components, and/or one or more other components (such as one or more input/output components, buttons, sensors, and so on). The controller may execute one or more sets of instructions stored in the non-transitory storage media to perform various functions.

For example, an electronic device (such as one or more of the financial account device 1501, the enabling device 1503, and/or the payment accepting device 1531) may be operable to receive identification information, such as one or more hashes and/or other digital representations of one or more biometrics, one or more account logins, one or more passwords, and so on. The electronic device may transmit the identification information directly and/or indirectly to the identity system device 1502. The identity system device 1502 may determine whether the identification information is associated with stored identity information (such as one or more names, addresses, phone numbers, social security numbers, credit card and/or other financial information, payment records, purchase and/or other behavior records, age and/or verified age, driver's license and/or other identification or authorization information, vehicle rental contract information, insurance verification, and so on). If so, the identity system device 1502 may return and/or otherwise allow access to associated identity information and/or one or more attestations regarding such directly and/or indirectly to the electronic device (such as a name of a person, as one or more permissions related to the use of a financial account associated with the financial account device 1501, and so on). The electronic device may use the identity information and/or attestation regarding such to authorize and/or deny and/or otherwise restrict use of the financial account device 1501.

In various embodiments, the electronic device may reobtain the identification information and/or the identity information and/or attestation each time use of the financial account device 1501 and/or the electronic device is attempted. If the electronic device is not able to reobtain the identification information and/or the identity information and/or attestation, the electronic device may deauthorize operation. This may prevent and/or otherwise restrict a person from providing the identification information to authorize use of the financial account device 1501 and then providing the electronic device or financial account device 1501 to another person. In other embodiments, the electronic device may reobtain the identification information and/or the identity information and/or attestation upon the occurrence of a condition, such as movement of the electronic device and/or the financial account device 1501, alteration of the electronic device and/or the financial account device 1501, expiration of a time period (such as ten minutes, one day, and so on), interruption of a communication connection between the electronic device and another device (such as the identity system device 1502, the financial account device 1501, and so on), receipt of a deauthorization signal, travel of the electronic device away from the financial account device 1501 and/or vice versa, and so on. This may balance fraud prevention and functionality with minimized network communication, efficient operation, and so on.

Although the system 1500 is illustrated and described in the context of accepting payments, it is understood that this is an example and that other contexts are possible and contemplated. Similar techniques may be used in the context of receiving payments, providing payments, and so on. Various configurations are possible and contemplated without departing from the scope of the present disclosure.

For example, the payment accepting device 1531 is described as a payment accepting device 1531. However, it is understood that this is an example. In other implementations, the payment accepting device 1531 may be a payment receiving device, a payment providing device, and/or a device that performs one or more other roles. Various configurations are possible and contemplated without departing from the scope of the present disclosure.

Figure 16:
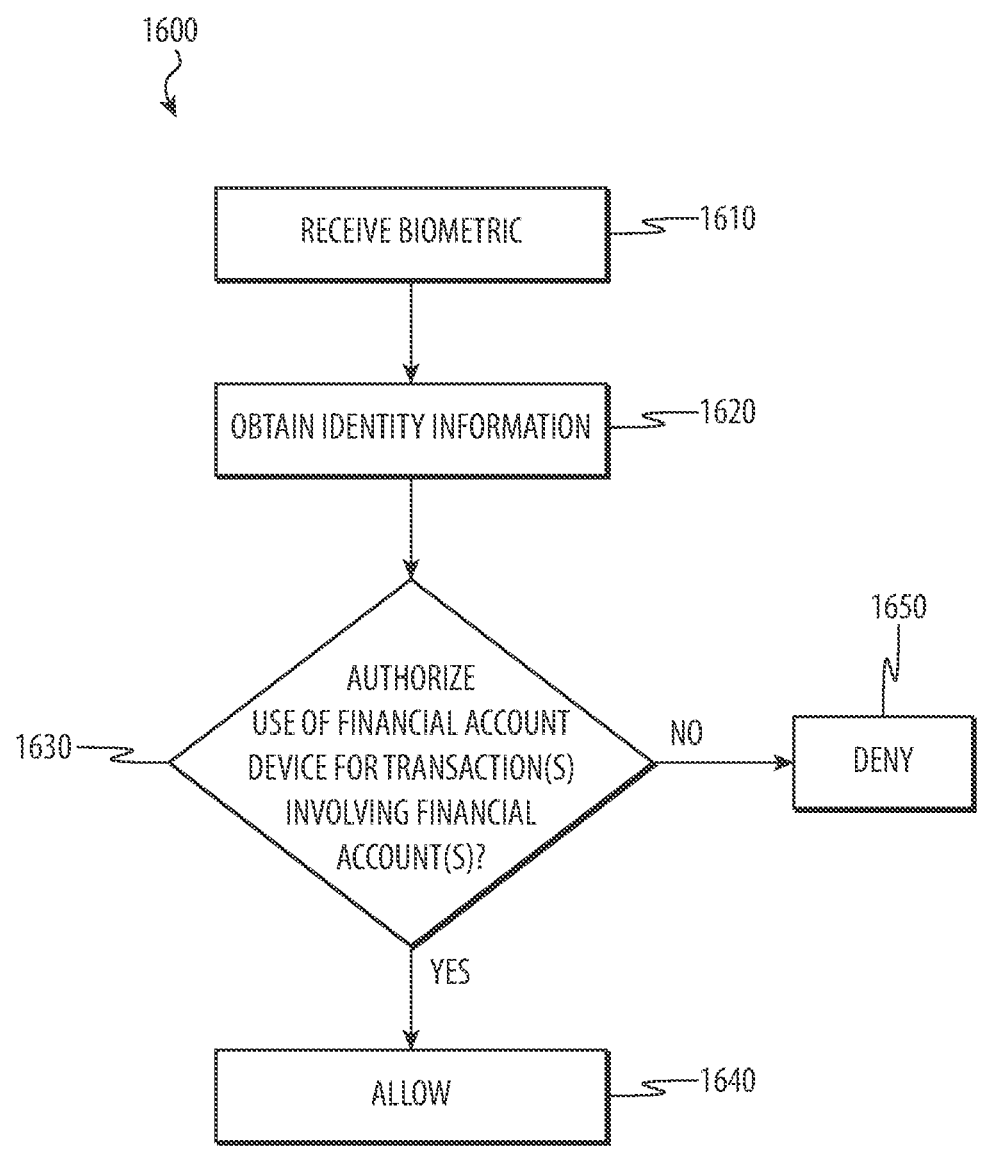
FIG. 16 depicts a flow chart illustrating a first example method for authorizing a mobile identity information controlled financial account device. This method may be performed by one or more of the systems of FIGS. 15 and 18-22B.

FIG. 16 depicts a flow chart illustrating a first example method 1600 for authorizing a mobile identity information controlled financial account device. This method 1600 may be performed by one or more of the systems 1500, 1800-2200 of FIGS. 15 and 18-22B.

At operation 1610, an electronic device (such as one or more of the financial account devices 1501, 1801-2201 and/or the enabling devices 1503, 1903, 2103, 2203A, 2203B of FIGS. 15 and 18-22B) may receive at least one digital representation of a biometric. For example, the electronic device may receive one or more digital representations of one or more biometrics (such as a hash and/or other digital representation of a fingerprint, a voiceprint, a facial image, a retina image, an iris image, a deoxyribonucleic acid sequence, a heart rhythm, a gait, a palm scan, a vein scan, and so on) obtained using one or more biometric reader devices (such as a fingerprint scanner, an optical fingerprint scanner, a phosphorescent fingerprint scanner, a palm scanner, a vein scanner, a time-of-flight sensor, a camera, an image sensor, a saliva sensor, a deoxyribonucleic acid sensor, a heart rhythm monitor, a microphone, and so on).

At operation 1620, the electronic device may obtain identity information. For example, the electronic device may provide the at least one digital representation of the biometric to one or more identity system devices (such as the identity system device 1502 of FIG. 15) and receive the identity information in return based upon the one or more identity system devices determining a correspondence between the at least one digital representation of the biometric and stored biometric data associated with the identity information.

At operation 1630, the electronic device may determine whether or not to authorize use of a financial account device for one or more transactions involving one or more financial accounts. Determining whether or not to authorize use of the financial account device for the one or more transactions involving the one or more financial accounts may involve evaluating the identity information, transaction information, one or more transaction restrictions specified in one or more permissions that limit use to transactions having specific characteristics, a current time, a current location, one or permissions (such as one or more permissions associated with the identity information, the one or more financial accounts, the financial account devices, the one or more transactions, and so on).

If so, the flow may proceed to operation 1640 where the electronic device may allow use of the financial account device for the one or more transactions involving the one or more financial accounts. In some examples, the electronic device allowing use of the financial account device for the one or more transactions involving the one or more financial accounts may involve transmitting an authorization signal to the financial account device. In various examples, the electronic device allowing use of the financial account device for the one or more transactions involving the one or more financial accounts may involve providing the financial account device an authorization indication and/or other authorization token, such as an authorization token provided by an identity system device that the financial account device may provide to a payment accepting device. Such an authorization token may be encrypted with a private key of a public/private key pair that is associated with the identity system device in order to enable the payment accepting device or other device to verify the authorization token by decrypting the authorization token using the public key of the public/private key pair. Otherwise, the flow may proceed to operation 1650 where the electronic device may deny use of the financial account device for the one or more transactions involving the one or more financial accounts.

In various examples, this example method 1600 may be implemented as a group of interrelated software modules or components that perform various functions discussed herein. These software modules or components may be executed within a cloud network and/or by one or more computing devices, such as one or more of the financial account devices 1501, 1801-2201 and/or the enabling devices 1503, 1903, 2103, 2203A, 2203B of FIGS. 15 and 18-22B.

Although the example method 1600 is illustrated and described as including particular operations performed in a particular order, it is understood that this is an example. In various implementations, various orders of the same, similar, and/or different operations may be performed without departing from the scope of the present disclosure.

For example, the method 1600 is illustrated and described as authorizing the use of the financial account device for the one or more transactions involving the one or more financial accounts. However, it is understood that this is an example. In various implementations, the method 1600 may be performed by the financial account device itself. Alternatively, in a number of implementations, the method 1600 may authorize the use of one or more financial accounts without involvement of any kind of financial account device. Various configurations are possible and contemplated without departing from the scope of the present disclosure.

Figure 17:
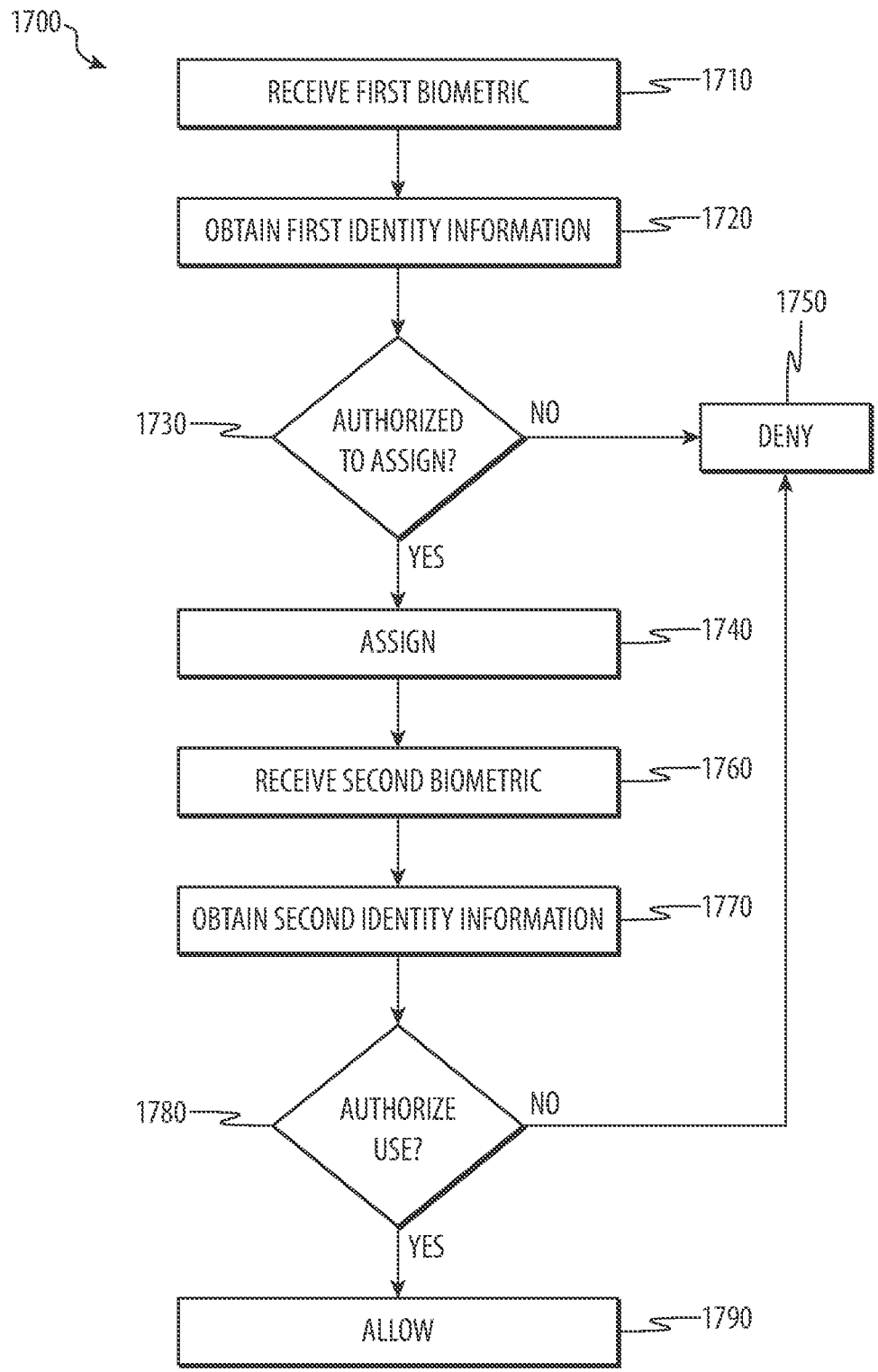
FIG. 17 depicts a flow chart illustrating a second example method for authorizing a mobile identity information controlled financial account device. This method may be performed by one or more of the systems of FIGS. 15 and 18-22B.

FIG. 17 depicts a flow chart illustrating a second example method 1700 for authorizing a mobile identity information controlled financial account device. This method 1700 may be performed by one or more of the systems 1500, 1800-2200 of FIGS. 15 and 18-22B.

At operation 1710, an electronic device (such as one or more of the financial account devices 1501, 1801-2201 and/or the enabling devices 1503, 1903, 2103, 2203A, 2203B of FIGS. 15 and 18-22B) may receive a first digital representation of a biometric for a first person. The electronic device may also receive a request to assign one or more permissions related to use of one or more financial accounts and/or financial account devices. For example, the electronic device may receive a first digital representation of a biometric for a first person (such as a hash and/or other digital representation of a fingerprint, a voiceprint, a facial image, a retina image, an iris image, a deoxyribonucleic acid sequence, a heart rhythm, a gait, a palm scan, a vein scan, and so on) obtained using one or more biometric reader devices (such as a fingerprint scanner, an optical fingerprint scanner, a phosphorescent fingerprint scanner, a palm scanner, a vein scanner, a time-of-flight sensor, a camera, an image sensor, a saliva sensor, a deoxyribonucleic acid sensor, a heart rhythm monitor, a microphone, and so on).

At operation 1720, the electronic device may obtain first identity information associated with the first person. For example, the electronic device may provide the first digital representation of the biometric for the first person to one or more identity system devices (such as the identity system device 1502 of FIG. 15) and receive the first identity information in return based upon the one or more identity system devices determining a correspondence between the first digital representation of the biometric for the first person and stored biometric data associated with the first identity information.

At operation 1730, the electronic device may determine whether the first identity information indicates that the first person is authorized to assign one or more requested permissions related to use of the one or more financial accounts and/or the one or more financial account devices. If so, the flow may proceed to operation 1740 where the electronic device allows the one or more requested permissions related to use of the one or more financial accounts and/or the one or more financial account devices to be assigned. This may involve transmitting the one or more requested permissions related to use of the one or more financial accounts and/or the one or more financial account devices to one or more identity system devices (such as the identity system device 1502 of FIG. 15) to be recorded in one or more sets of stored identity information. Otherwise, the flow may proceed to operation 1750 where the electronic device may deny the request to assign the one or more requested permissions related to use of the one or more financial accounts and/or the one or more financial account devices.

At operation 1760, the electronic device may receive a second digital representation of a biometric for a second person. For example, the electronic device may receive a second digital representation of a biometric for a second person obtained using one or more biometric reader devices.

At operation 1770, the electronic device may obtain second identity information associated with the second person. For example, the electronic device may provide the second digital representation of the biometric for the second person to one or more identity system devices (such as the identity system device 1502 of FIG. 15) and receive the second identity information in return based upon the one or more identity system devices determining a correspondence between the second digital representation of the biometric for the second person and stored biometric data associated with the second identity information.

At operation 1780, the electronic device may determine whether or not to authorize use of a financial account device for one or more transactions involving one or more financial accounts. Determining whether or not to authorize use of the financial account device for the one or more transactions involving the one or more financial accounts may involve evaluating the second identity information, the first identity information, transaction information, one or more transaction restrictions specified in one or more permissions that limit use to transactions having specific characteristics, a current time, a current location, one or more permissions (such as one or more permissions associated with the first identity information, one or more permissions associated with the second identity information, the one or more financial accounts, the financial account devices, the one or more transactions, and so on).

If so, the flow may proceed to operation 1790 where the electronic device may allow use of the financial account device for the one or more transactions involving the one or more financial accounts. In some examples, the electronic device allowing use of the financial account device for the one or more transactions involving the one or more financial accounts may involve transmitting an authorization signal to the financial account device. Otherwise, the flow may proceed to operation 1750 where the electronic device may deny use of the financial account device for the one or more transactions involving the one or more financial accounts.

In various examples, this example method 1700 may be implemented as a group of interrelated software modules or components that perform various functions discussed herein. These software modules or components may be executed within a cloud network and/or by one or more computing devices, such as one or more of the financial account devices 1501, 1801-2201 and/or the enabling devices 1503, 1903, 2103, 2203A, 2203B of FIGS. 15 and 18-22B.

Although the example method 1700 is illustrated and described as including particular operations performed in a particular order, it is understood that this is an example. In various implementations, various orders of the same, similar, and/or different operations may be performed without departing from the scope of the present disclosure.

For example, the method 1700 is illustrated and described as involving a first person assigning one or more permissions to a second person. However, it is understood that this is an example. In various implementations, a person may assign one or more permissions to himself, remove one or more existing permissions, assign one or more permissions to multiple people, and so on. Further, in a number of examples, different devices may be involved with assignment of permissions and authorization of use. Various configurations are possible and contemplated without departing from the scope of the present disclosure.

Figure 18:
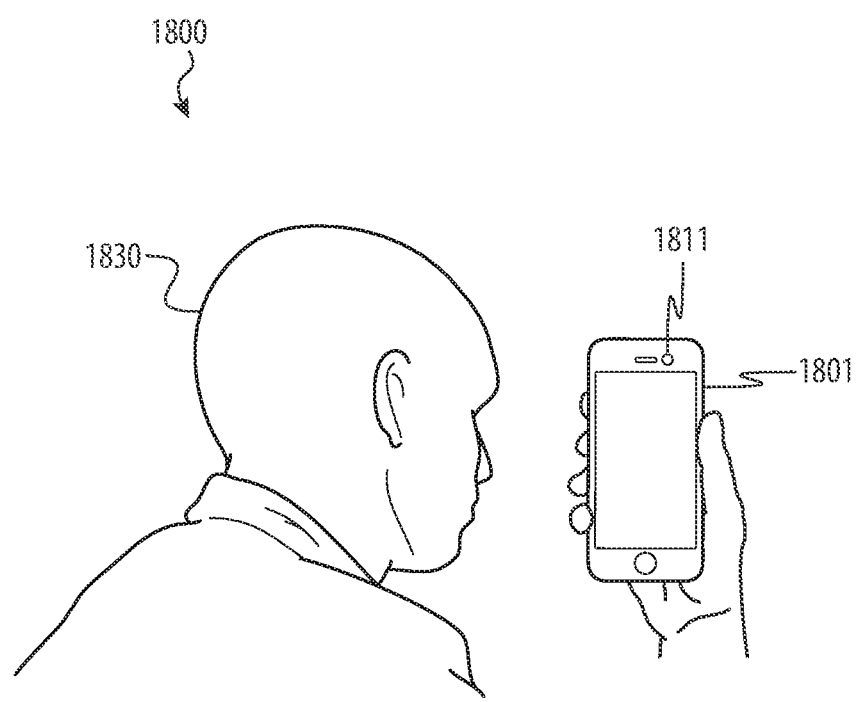
FIG. 18 depicts a second example system for authorizing a mobile identity information controlled financial account device.

FIG. 18 depicts a second example system 1800 for authorizing a mobile identity information controlled financial account device. The system 1800 may include a person 1830 using a financial account device 1801 that includes a biometric reader device 1811. In this example, the financial account device 1801 is a smart phone and the biometric reader device 1811 may be a time-of flight sensor or other image sensor, such as a camera. Further in this example, the smart phone may also serve the function of a payment accepting device as the smart phone may implement a web browser that is operable to accept a payment via one or more financial accounts associated with the person 1830 and/or the smart phone. The smart phone may use the biometric reader device 1811 to obtain a facial image of the person 1830, use a digital representation of the facial image to obtain identity information for the person 1830, and determine whether or not to authorize use of the smart phone for one or more transactions via the web browser involving the one or more financial accounts. However, it is understood that this is an example. Various configurations are possible and contemplated without departing from the scope of the present disclosure.

Figure 19:
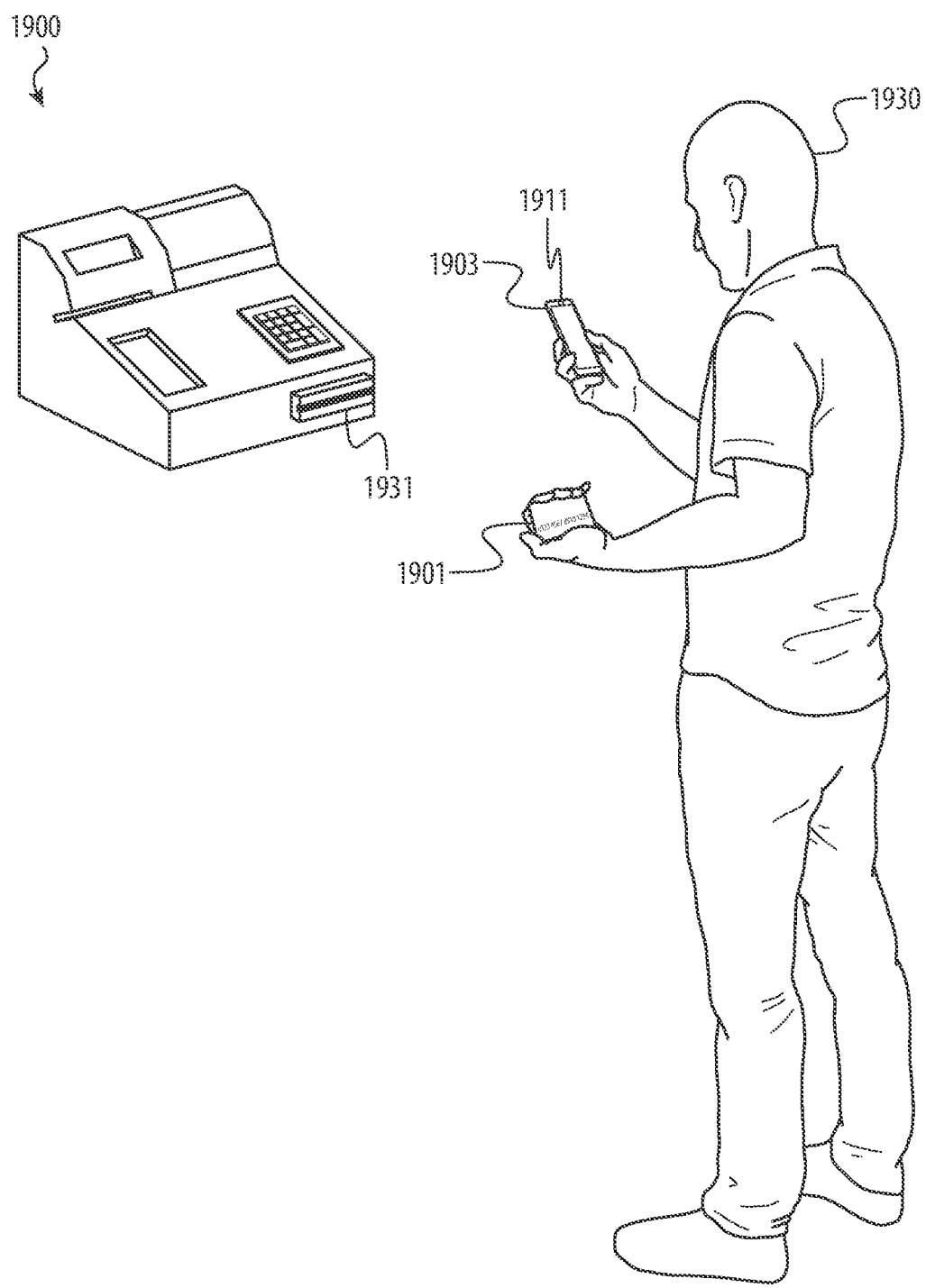
FIG. 19 depicts a third example system for authorizing a mobile identity information controlled financial account device.

FIG. 19 depicts a third example system 1900 for authorizing a mobile identity information controlled financial account device. The system 1900 may include a person 1930 using a financial account device 1901 that is a smart credit card associated with one or more financial accounts. The system 1900 may also include an enabling device 1903 that includes a biometric reader device 1911. In this example, the enabling device 1903 may be a smart phone and the biometric reader device 1911 may be a time-of flight sensor or other image sensor, such as a camera. Further in this example, the system 1900 may include a payment accepting device 1931 that is a magnetic strip scanner on a point of sale device. The smart phone may use the biometric reader device 1911 to obtain a facial image of the person 1930, use a digital representation of the facial image to obtain identity information for the person 1930, and determine whether or not to authorize use of the smart credit card for one or more transactions via the magnetic strip scanner on the point of sale device involving the one or more financial accounts. However, it is understood that this is an example. Various configurations are possible and contemplated without departing from the scope of the present disclosure.

Figure 20:
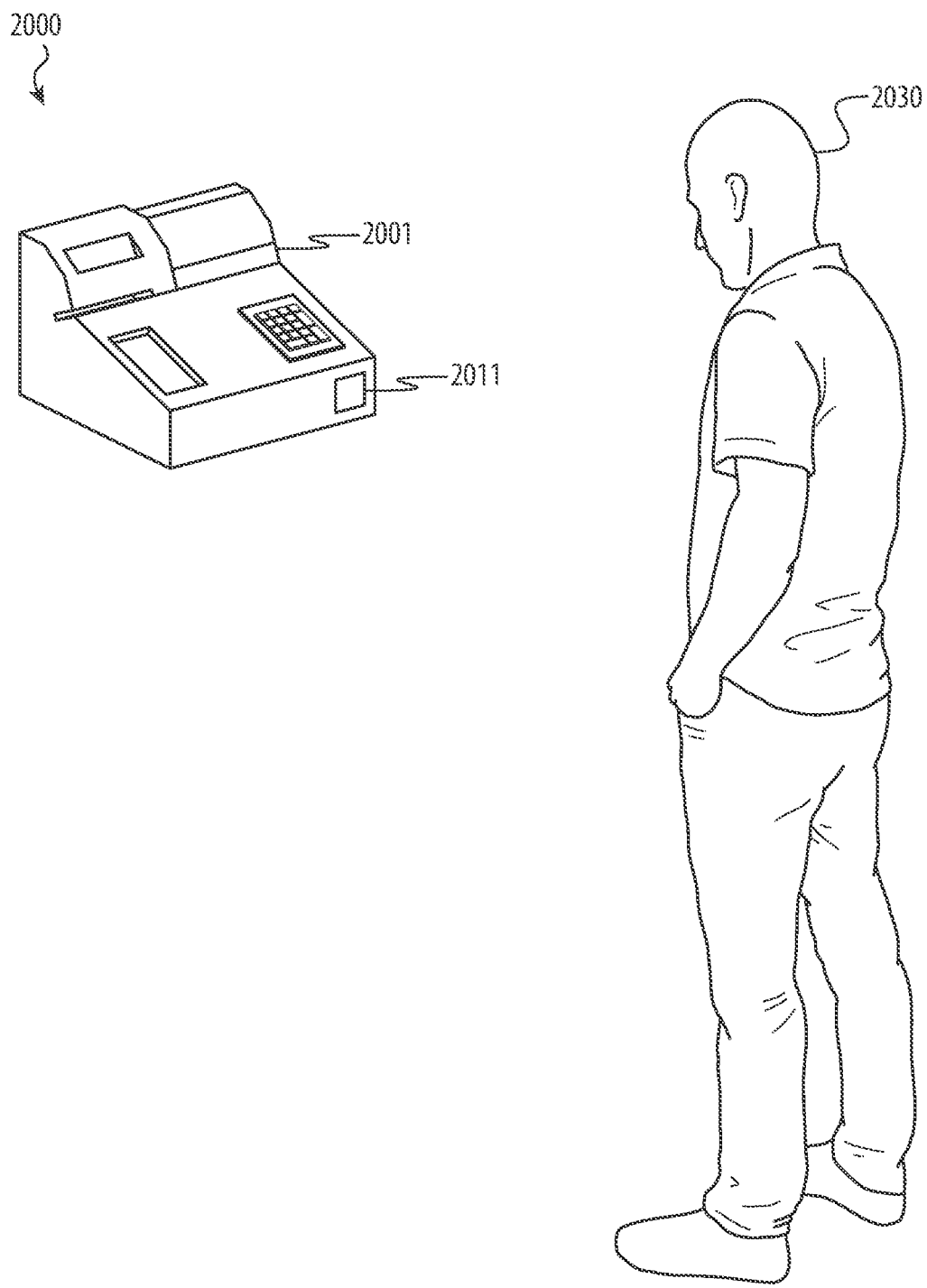
FIG. 20 depicts a fourth example system for authorizing a mobile identity information controlled financial account device.

FIG. 20 depicts a fourth example system 2000 for authorizing a mobile identity information controlled financial account device. The system 2000 may include a person 2030 using a financial account device 2001 that includes a biometric reader device 2011. In this example, the financial account device 2001 is a point of sale device and the biometric reader device 2011 may be a biometric scanner (such as a fingerprint scanner, a palm scanner, a vein scanner, and so on). Further in this example, the point of sale device may also serve the function of a payment accepting device as the point of sale device may be operable to accept payments for one or more transactions associated with one or more financial accounts. The point of sale device may use the biometric reader device 2011 to obtain a scan of a biometric from the person 2030, use a digital representation of the scan of the biometric to obtain identity information for the person 2030, and determine whether or not to authorize use of the point of sale device for one or more transactions involving the one or more financial accounts. However, it is understood that this is an example. Various configurations are possible and contemplated without departing from the scope of the present disclosure.

The system 2000 is illustrated as a register point of sale device with an integrated biometric reader device 2011. However, it is understood that this is an example. In other implementations, the point of sale device may be an electronic device, such as a tablet computing device, that connects to a credit card reader device (such as is provided by Square™) with an incorporated biometric reader device 2011. Various configurations are possible and contemplated without departing from the scope of the present disclosure.

Figure 21:
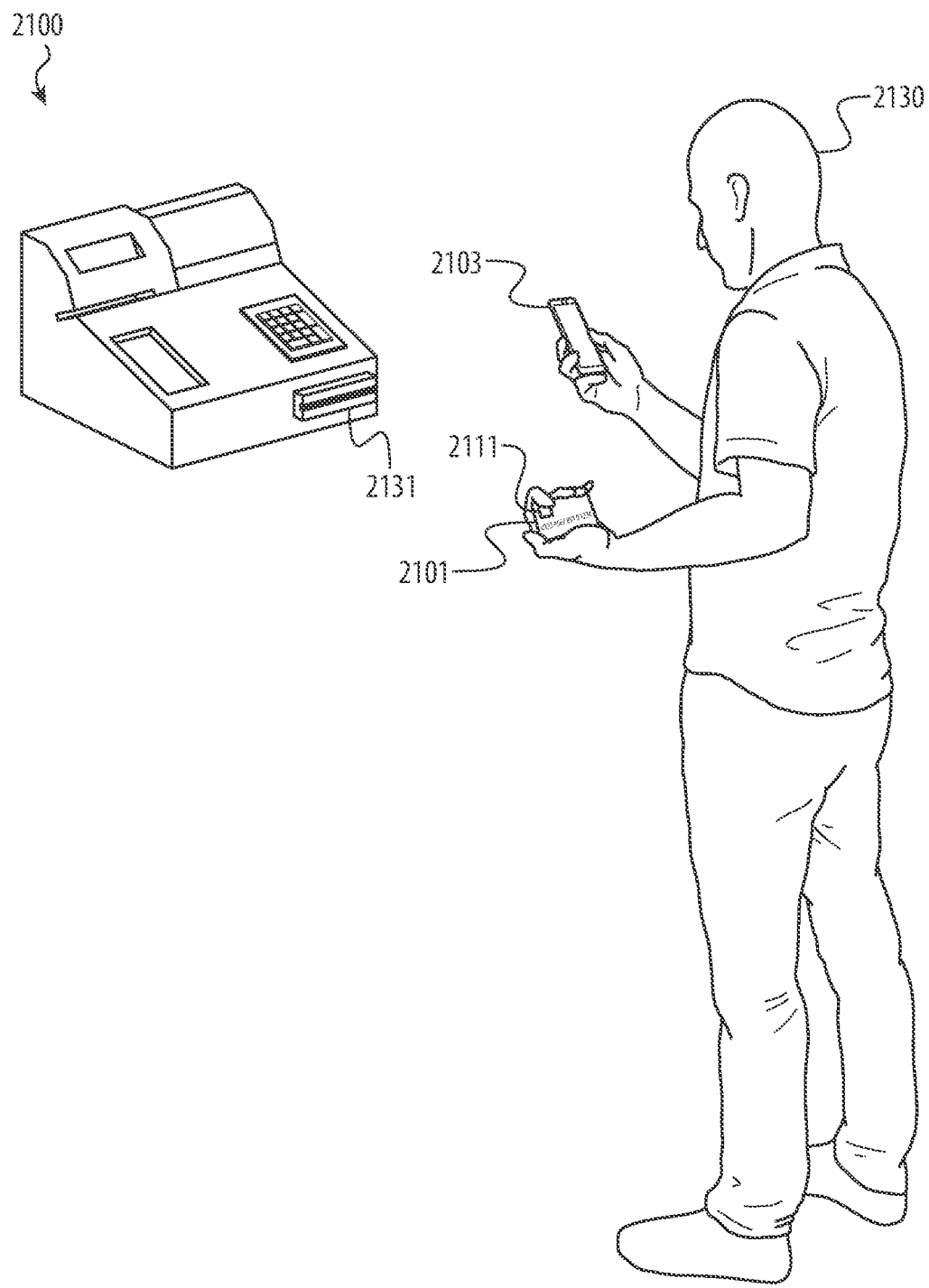
FIG. 21 depicts a fifth example system for authorizing a mobile identity information controlled financial account device.

FIG. 21 depicts a fifth example system 2100 for authorizing a mobile identity information controlled financial account device. The system 2100 may include a person 2130 using a financial account device 2101 that is a smart card associated with one or more financial accounts and including a biometric reader device 2111 that is a fingerprint sensor. The system 2100 may also include an enabling device 2103 that is a smart phone and a payment accepting device 2131 that is a magnetic strip scanner on a point of sale device. The smart card may use the fingerprint sensor to obtain fingerprint data for the person 2130 and transmit a digital representation thereof to the smart phone. The smart phone may use the digital representation of the fingerprint data to obtain identity information for the person 2130 and determine whether or not to authorize use of the smart card for one or more transactions via the magnetic strip scanner on the point of sale device involving the one or more financial accounts. However, it is understood that this is an example. Various configurations are possible and contemplated without departing from the scope of the present disclosure.

Figure 22A:
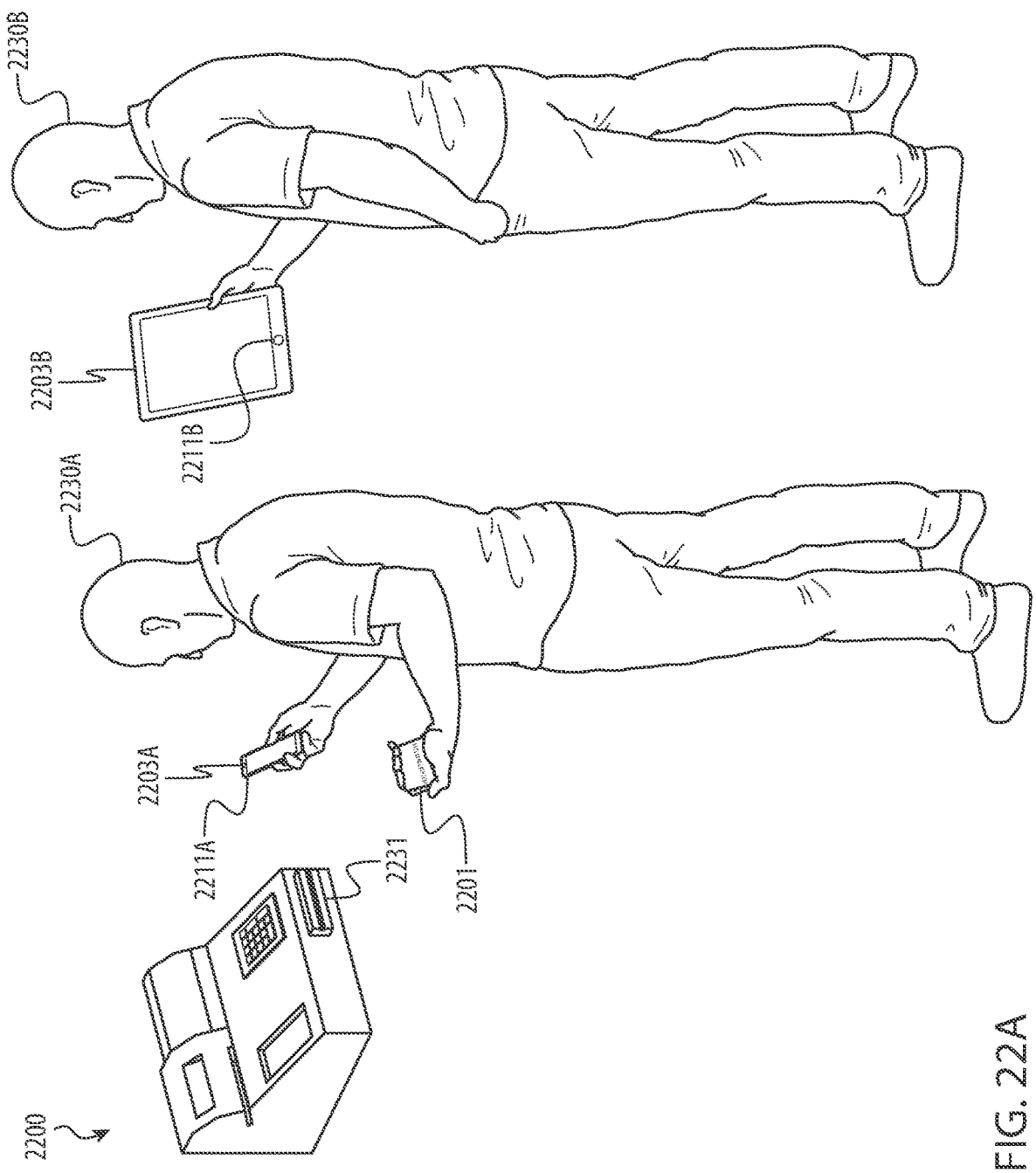
FIG. 22A depicts a sixth example system for authorizing a mobile identity information controlled financial account device.

FIG. 22A depicts a sixth example system 2200 for authorizing a mobile identity information controlled financial account device. The system 2200 may include a first person 2230A using a financial account device 2201 that is a smart credit card associated with one or more financial accounts and a first enabling device 2203A that is a smart phone with a first biometric reader device 2211A that is a first time-of flight sensor or other image sensor, such as a camera. The first person 2230A may use the first smart phone to assign one or more permissions regarding use of the smart credit card and/or the one or more financial accounts to a second person 2230B. This may enable the second person 2230B to use the smart credit card and/or the one or more financial accounts for one or more transactions via a payment accepting device 2231 that is a magnetic strip scanner on a point of sale device. As shown, the second person 2230B may be using a second enabling device 2203B that may be a tablet computing device with a second biometric reader device 2211B that is a second time-of flight sensor or other image sensor, such as a camera.

The first person 2230A may use the smart phone and the first time-of-flight sensor to obtain a first facial image of the first person 2230A and specify one or more permissions regarding use of the smart credit card and/or the one or more financial accounts to assign to the second person 2230B. The smart phone may use a digital representation of the first facial image to obtain first identity information for the first person 2230A and determine whether or not the first person 2230A is authorized to assign the one or more permissions regarding use of the smart credit card and/or the one or more financial accounts to the second person 2230B. If so, the one or more permissions regarding use of the smart credit card and/or the one or more financial accounts may be assigned to the second person 2230B.

Figure 22B:
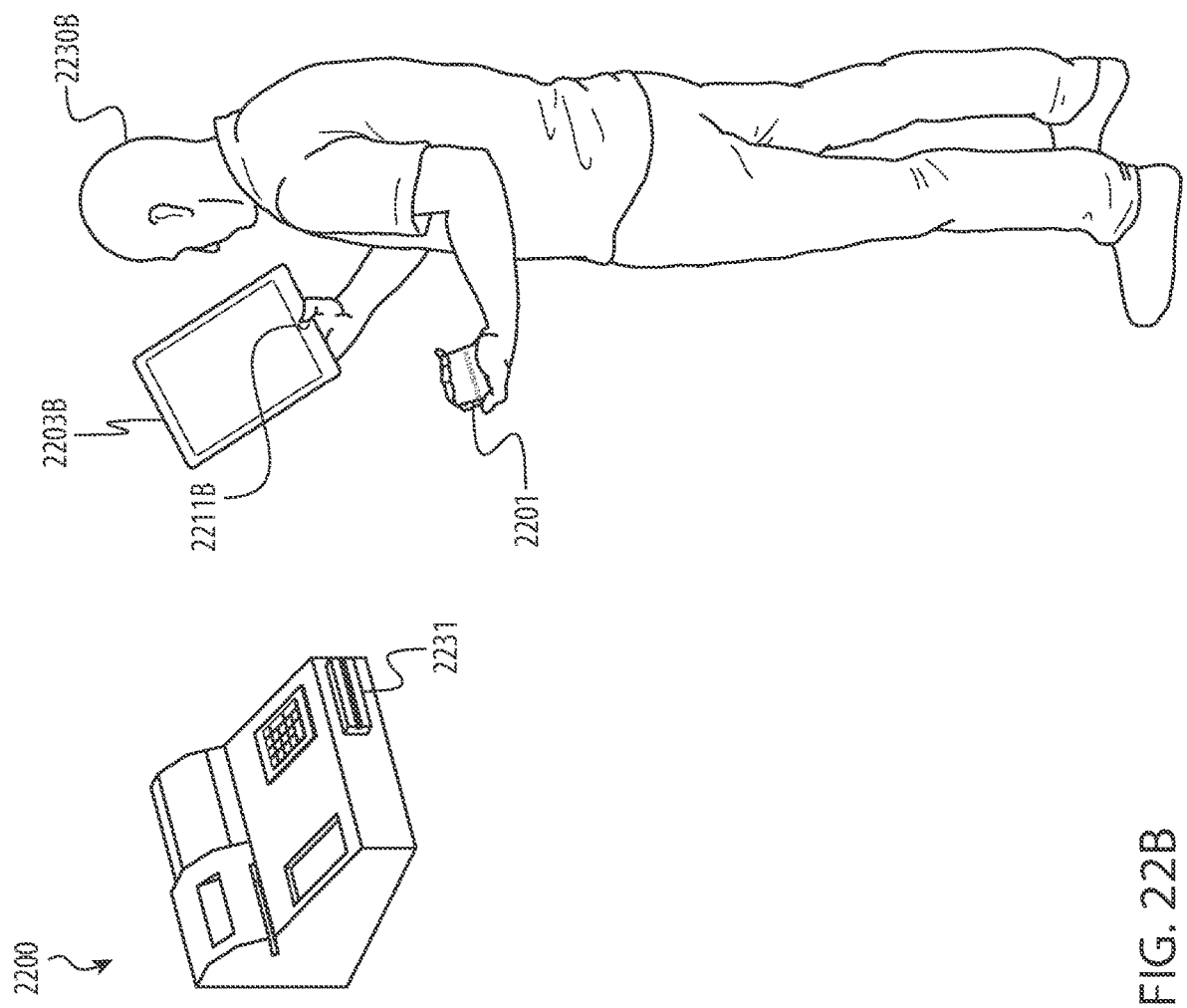
FIG. 22B depicts the system of FIG. 22A as the second person attempts to accept authorization to use the mobile identity information controlled financial account device.

Subsequently, as shown in FIG. 22B, the second person 2230B may attempt to accept authorization to use the smart credit card. The second person 2230B may use the tablet computing device and second time-of-flight sensor to obtain a second facial image of the second person 2230B and accept the assigned one or more permissions regarding use of the smart credit card and/or the one or more financial accounts. In some examples, the tablet computing device may be contacted by another device, such as the smart phone, to obtain the second facial image of the second person. The tablet computing device may use a digital representation of the second facial image to obtain second identity information for the second person 2230B and determine to authorize use of the smart credit card and/or the one or more financial accounts for the second person 2230B via the magnetic strip reader of the point of sale device based on the second identity information and the one or more permissions regarding use of the smart credit card and/or the one or more financial accounts. However, it is understood that this is an example. Various configurations are possible and contemplated without departing from the scope of the present disclosure.

By way of illustration, FIGS. 22A and 22B illustrate the first person 2230A and the second person 2230B using different enabling devices 2203A, 2203B and different biometric reader devices 2211A, 2211B. However, it is understood that this is an example. In other implementations, a single device may be used instead of the different enabling devices 2203A, 2203B and/or the different biometric reader devices 2211A, 2211B. Various configurations are possible and contemplated without departing from the scope of the present disclosure.

In another example, multiple parties in a corporation may be authorized to use a corporate credit card, but may be restricted from using the corporate credit card when personally involved in a transaction. By way of illustration, a person may be among a set of people authorized to use the company credit card, but that use may be subject to approval by another from the set when the person is being paid by the transaction, would obtain personal use of the subject of the transaction, and so on. For example, a first person may provide a first biometric when using the corporate credit card and a second authorized person who is present may also be required to provide a second biometric if the first person is personally involved in the transaction. In another example, the second authorized person may not be present and instead an electronic device associated with the second authorized person may be contacted to obtain the second biometric from the second authorized person. Various configurations are possible and contemplated without departing from the scope of the present disclosure.

In such scenarios, one or more copies of the corporate credit card may be provided to various people in the corporation and each person's individual use of one or more of the copies of the corporate credit card may be controlled based on one or more sets of permissions according to that person's role in the corporation. By way of illustration, travelling service technicians may be authorized to use a copy of the corporate credit card for non-entertainment travel expenses, sales staff may be authorized to use a copy of the corporate credit card for non-entertainment travel expenses as well as entertainment expenses not exceeding $500, and so on. Further, such permissions may be updated according to changes in roles, such as cancelling of all permissions for a person upon termination so that the person is no longer able to use any copy of the corporate credit card for any purpose.

In various implementations, a system for authorizing a mobile identity information controlled financial account device may include a non-transitory storage medium that stores instructions, a biometric reader device, at least one communication unit, and a processor. The processor may execute the instructions to communicate with the mobile identity information controlled financial account device using the at least one communication unit; receive at least one digital representation of a biometric using the biometric reader device; obtain identity information from an identity system device, via the at least one communication unit, using the at least one digital representation of the biometric; and determine whether to transmit an authorization signal to the mobile identity information controlled financial account device using the at least one communication unit based on the identity information wherein the authorization signal enables use of the mobile identity information controlled financial account device in at least one transaction involving at least one financial account.

In some examples, the at least one communication unit may be a short-range communication unit and a long-range communication unit, the processor may communicate with the mobile identity information controlled financial account device using the short-range communication unit, and the processor may obtain the identity information from the identity system device using the long-range communication unit. In various such examples, the short-range communication unit may be at least one of a near-field communication unit, a Bluetooth communication unit, or a Bluetooth Low Energy communication unit and the long-range communication unit may be a WiFi communication unit or a cellular communication unit.

In a number of examples, the mobile identity information controlled financial account device may be configured to deauthorize after receiving the authorization signal if the communication between the mobile identity information controlled financial account device and the at least one communication unit is interrupted. In some examples, the identity information may include at least one permission and the processor may determine whether to transmit the authorization signal based on the at least one permission. In a number of such examples, the at least one permission may restrict at least one of a transaction time, a transaction place, a transaction subject, a transaction amount, an aggregate transaction amount, or an aggregate number of transactions. In various examples, the processor may receive transaction information for the at least one transaction and evaluate the transaction information in determining whether to transmit the authorization signal.

In some implementations, a mobile identity information controlled financial account device may include a non-transitory storage medium that stores instructions, a communication unit operative to communicate with an enabling device, and a controller. The controller may execute the instructions to obtain at least one digital representation of a biometric, transmit the at least one digital representation of the biometric to the enabling device using the communication unit, and determine whether to authorize use of the mobile identity information controlled financial account device in at least one transaction involving at least one financial account based on identity information obtained by the enabling device from an identity system device using the at least one digital representation of the biometric.

In various examples, the controller may determine to authorize use of the mobile identity information controlled financial account device and transmit an authorization indication to a payment accepting device for the at least one transaction.

In some examples, the mobile identity information controlled financial account device may further include a biometric reader device that the controller may use to obtain the at least one digital representation of the biometric. In a number of such examples, the at least one digital representation of the biometric may be a first digital representation of a biometric and the controller may be operative to receive a second digital representation of a biometric via the biometric reader device and deauthorize use of the mobile identity information controlled financial account device when the second digital representation of the biometric mismatches the first digital representation of the biometric. In some such examples, the controller may attempt to reauthorize use of the mobile identity information controlled financial account device by transmitting the second digital representation of the biometric to the enabling device using the communication unit.

In a number of examples, the controller may deauthorize operation of the mobile identity information controlled financial account device upon interruption of communication with the enabling device.

In various embodiments, a system for authorizing a mobile identity information controlled financial account device may include a non-transitory storage medium that stores instructions, at least one biometric reader device, at least one communication unit, and a processor. The processor may execute the instructions to communicate with the mobile identity information controlled financial account device using the at least one communication unit; receive a first digital representation of a biometric for a first person using the at least one biometric reader device; receive at least one permission from the first person to assign regarding the mobile identity information controlled financial account device; receive a second digital representation of a biometric for a second person using the at least one biometric reader device; obtain identity information from an identity system device, via the at least one communication unit, using the second digital representation of the biometric for the second person; and determine whether to transmit an authorization signal to the mobile identity information controlled financial account device using the at least one communication unit based on the identity information and the at least one permission wherein the authorization signal enables use of the mobile identity information controlled financial account device in at least one transaction involving at least one financial account.

In some examples, the first digital representation of the biometric for the first person and the second digital representation of the biometric for the second person may be received from a same electronic device that includes the at least one biometric reader device.

In a number of examples, the first digital representation of the biometric for the first person may be received from a first electronic device that includes a first biometric reader device and the second digital representation of the biometric for the second person may be received from a second electronic device that includes a second biometric reader device. In some such examples, the processor may request the second digital representation of the biometric for the second person from the second electronic device upon receipt of the at least one permission. In various such examples, the mobile identity information controlled financial account device may be configured to deauthorize after receiving the authorization signal upon interruption of communication between the mobile identity information controlled financial account device and the at least one communication unit.

In some examples, the at least one permission may be temporary. In various examples, the at least one permission may specify transaction restrictions.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to authorizing a mobile identity information controlled financial account device. A processing unit and a mobile identity information controlled financial account device may communicate directly or indirectly. The processing unit may receive at least one digital representation of a biometric (such as via a biometric reader device included in and/or separate from the mobile identity information controlled financial account device), obtain identity information using the at least one digital representation of the biometric (such as via an identity system device), and determine whether or not to transmit an authorization signal to the mobile identity information controlled financial account device that enables use of the mobile identity information controlled financial account device in at least one transaction involving at least one financial account (such as when the mobile identity information controlled financial account device is presented to a payment accepting device associated with the at least one transaction). The mobile identity information controlled financial account device may be usable for the at least one transaction when the mobile identity information controlled financial account device receives the authorization signal. The processing unit may also receive a first digital representation of a biometric for a first person along with at least one permission to assign regarding the mobile identity information controlled financial account device and then determine whether or not to authorize use of the mobile identity information controlled financial account device when a second digital representation of a biometric for a second person is received.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for authorizing a mobile identity information controlled financial account device, comprising:
   an enabling device that is separate from the mobile identity information controlled financial account device, comprising:
   a non-transitory storage medium that stores instructions;
   a biometric reader device;
   at least one communication unit; and
   a processor that executes the instructions to:
   communicate with the mobile identity information controlled financial account device using the at least one communication unit;
   interact with a person to receive at least one digital representation of a biometric using the biometric reader device;
   obtain identity information for the person from an identity system device, via the at least one communication unit, using the at least one digital representation of the biometric; and
   determine whether to transmit an authorization signal to the mobile identity information controlled financial account device using the at least one communication unit based on the identity information wherein the authorization signal enables use of the mobile identity information controlled financial account device by at least one of the person or an additional person in at least one transaction involving at least one financial account.

2. The system of claim 1, wherein:
   the at least one communication unit comprises a short-range communication unit and a long-range communication unit;
   the processor communicates with the mobile identity information controlled financial account device using the short-range communication unit; and
   the processor obtains the identity information from the identity system device using the long-range communication unit.

3. The system of claim 2, wherein:
   the short-range communication unit comprises at least one of a near-field communication unit, a Bluetooth communication unit, or a Bluetooth Low Energy communication unit; and
   the long-range communication unit comprises a WiFi communication unit or a cellular communication unit.

4. The system of claim 1, wherein the mobile identity information controlled financial account device is configured to deauthorize after receiving the authorization signal if the communication between the mobile identity information controlled financial account device and the at least one communication unit is interrupted.

5. The system of claim 1, wherein:
   the identity information includes at least one permission; and the processor determines whether to transmit the authorization signal based on the at least one permission.

6. The system of claim 5, wherein the at least one permission restricts at least one of:
 a transaction time;
 a transaction place;
 a transaction subject;
 a transaction amount;
 an aggregate transaction amount; or
 an aggregate number of transactions.

7. The system of claim 1, wherein the processor:
 receives transaction information for the at least one transaction; and
 evaluates the transaction information in determining whether to transmit the authorization signal.

8. A mobile identity information controlled financial account device, comprising:
 a non-transitory storage medium that stores instructions;
 a communication unit operative to communicate with an enabling device that is separate from the mobile identity information controlled financial account device; and
 a controller that executes the instructions to:
  obtain at least one digital representation of a biometric from an interaction between a person and the enabling device;
  transmit the at least one digital representation of the biometric to the enabling device using the communication unit; and
  determine whether to authorize use of the mobile identity information controlled financial account device by at least one of the person or an additional person in at least one transaction involving at least one financial account based on identity information for the person obtained by the enabling device from an identity system device using the at least one digital representation of the biometric.

9. The mobile identity information controlled financial account device of claim 8, wherein the controller:
 determines to authorize use of the mobile identity information controlled financial account device; and
 transmits an authorization indication to a payment accepting device for the at least one transaction.

10. The mobile identity information controlled financial account device of claim 8, further comprising a biometric reader device that the controller uses to obtain the at least one digital representation of the biometric.

11. The mobile identity information controlled financial account device of claim 10, wherein:
 the at least one digital representation of the biometric comprises a first digital representation of a biometric; and
 the controller is operative to:
  receive a second digital representation of a biometric via the biometric reader device; and
  deauthorize use of the mobile identity information controlled financial account device when the first digital representation of the biometric mismatches the second digital representation of the biometric.

12. The mobile identity information controlled financial account device of claim 11, wherein the controller attempts to reauthorize use of the mobile identity information controlled financial account device by transmitting the second digital representation of the biometric to the enabling device using the communication unit.

13. The mobile identity information controlled financial account device of claim 8, wherein the controller deauthorizes operation of the mobile identity information controlled financial account device upon interruption of communication with the enabling device.

14. A system for authorizing a mobile identity information controlled financial account device, comprising:
 an enabling device that is separate from the mobile identity information controlled financial account device, comprising:
  a non-transitory storage medium that stores instructions;
  at least one biometric reader device;
  at least one communication unit; and
  a processor that executes the instructions to:
   communicate with the mobile identity information controlled financial account device using the at least one communication unit;
   interact with a first person to receive a first digital representation of a biometric for the first person using the at least one biometric reader device;
   receive at least one permission from the first person to assign regarding the mobile identity information controlled financial account device;
   interact with a second person to receive a second digital representation of a biometric for the second person using the at least one biometric reader device;
   obtain identity information for the second person from an identity system device, via the at least one communication unit, using the second digital representation of the biometric for the second person; and
   determine whether to transmit an authorization signal to the mobile identity information controlled financial account device using the at least one communication unit based on the identity information for the second person and the at least one permission
   wherein the authorization signal enables use of the mobile identity information controlled financial account device by the second person in at least one transaction involving at least one financial account.

15. The system of claim 14, wherein the first digital representation of the biometric for the first person and the second digital representation of the biometric for the second person are received from a same electronic device that includes the at least one biometric reader device.

16. The system of claim 14, wherein:
 the first digital representation of the biometric for the first person is received from a first electronic device that includes a first biometric reader device; and
 the second digital representation of the biometric for the second person is received from a second electronic device that includes a second biometric reader device.

17. The system of claim 16, wherein the processor requests the second digital representation of the biometric for the second person from the second electronic device upon receipt of the at least one permission.

18. The system of claim 16, wherein the mobile identity information controlled financial account device is configured to deauthorize after receiving the authorization signal upon interruption of communication between the mobile identity information controlled financial account device and the at least one communication unit.

19. The system of claim 14, wherein the at least one permission is temporary.

20. The system of claim 14, wherein the at least one permission specifies transaction restrictions.

21. The system of claim 14, wherein the enabling device is a smart phone.

\* \* \* \* \*